(12) United States Patent
Kishimoto

(10) Patent No.: US 7,764,411 B2
(45) Date of Patent: Jul. 27, 2010

(54) COLOR PROCESSING APPARATUS AND METHOD, AND STORAGE MEDIUM STORING COLOR PROCESSING PROGRAM

(75) Inventor: Yasunari Kishimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 313 days.

(21) Appl. No.: 11/902,175

(22) Filed: Sep. 19, 2007

(65) Prior Publication Data

US 2008/0112026 A1 May 15, 2008

(30) Foreign Application Priority Data

Nov. 14, 2006 (JP) ............................. 2006-308228
Jun. 19, 2007 (JP) ............................. 2007-161655

(51) Int. Cl.
G03F 3/08 (2006.01)

(52) U.S. Cl. ................... 358/518; 358/1.9; 358/501; 358/519; 358/520; 382/162; 382/167; 345/589; 345/590; 345/593; 345/600; 345/603; 345/604

(58) Field of Classification Search ................. None
See application file for complete search history.

(56) References Cited

U.S. PATENT DOCUMENTS

| | | | |
|---|---|---|---|
| 2002/0021360 A1* | 2/2002 | Takemoto ................... 348/222 |
| 2002/0029715 A1* | 3/2002 | Ogatsu et al. ............... 101/494 |
| 2003/0002060 A1* | 1/2003 | Yokoyama et al. ........... 358/1.9 |
| 2003/0002095 A1* | 1/2003 | Gruzdev et al. ............. 358/518 |
| 2004/0046981 A1* | 3/2004 | Taka et al. .................. 358/1.9 |
| 2004/0227964 A1* | 11/2004 | Fujino ........................ 358/1.9 |
| 2007/0296986 A1* | 12/2007 | Watanabe et al. ............ 358/1.9 |
| 2008/0062193 A1* | 3/2008 | Olson ......................... 345/591 |

FOREIGN PATENT DOCUMENTS

JP 3794084 B 4/2006

* cited by examiner

*Primary Examiner*—Mark K Zimmerman
*Assistant Examiner*—Miya J Cato
(74) *Attorney, Agent, or Firm*—Morgan, Lewis & Bockius LLP

(57) ABSTRACT

A color processing apparatus determines, based on output color gamut information, the color gamut conversion condition for converting the image data so that the color gamut of image data on the predetermined color space may fall within the output color gamut, converts the color gamut of input image data according to the set color gamut conversion condition, determines the limiting condition of the color gamut conversion, changes the color value of the specified color so that the color value of the specified color out of the input image data may be converted into the color corresponding to the output satisfying the limiting condition, and pre-processes so as to change the color value other than the color value of the specified color out of the input image data according to the relation between the color value before change of the specified color and the color value after change.

15 Claims, 10 Drawing Sheets

COLOR PROCESSING APPARATUS AND METHOD, AND STORAGE MEDIUM STORING COLOR PROCESSING PROGRAM

CROSS-REFERENCE TO RELATED APPLICATION

This application claims priority under 35 USC 119 from Japanese Patent Application No. 2006-308228 filed Nov. 14, 2006 and Japanese Patent Application No. 2007-161655 filed Jun. 19, 2007.

BACKGROUND

1. Technical Field

The present invention relates to a color processing apparatus and method, and a storage medium storing a color processing program. More particularly, the present invention pertains to a color processing apparatus having a color gamut converting unit for converting color gamuts of input image data according to a set color gamut converting condition by setting the color gamut converting condition so that a color gamut of image data in a predetermined color space may fall within an output color gamut without depending on any particular device, a color processing method usable with the color processing apparatus, and a storage medium storing color processing program causing a computer to function as the color processing apparatus.

2. Background Art

Color gamuts reproducible by image output devices such as color printers or displays, or color gamuts read in by image input devices such as scanners are different from each other and depend on the type or model of the devices, and for example, when printing out with a color printer an image that has been displayed on a display, if image data for displaying an image on a display is directly output to a color printer, the color of images reproduced in the two devices is differ significantly depending on the difference between the color gamuts of the devices. As a technology for improving the difference in color reproduction, for example, it has been hitherto proposed to carry out conversion of color gamuts to replace colors in a device-independent color space that is not dependent on any specific device (for example, uniform sensory color space such as L*a*b* color space recommended by CIE (Commission Internationale de l'Eclairage), color space of tristimulus value CIEXYZ display color system, or CAM color space specified by color visible model such as CIAMAM02 (Colour Appearance Model 2002) with colors in the color gamut of the image data output device (also called Gamut mapping).

A first aspect of the present invention provides a color processing apparatus including a color gamut conversion unit, a setting unit and a pre-processing unit. The color gamut conversion unit sets, on the basis of output color gamut information expressing an output color gamut in a predetermined color space not depending on a specific device, a color gamut conversion condition for converting image data according to a specified conversion rule so that the color gamut of image data in the predetermined color space falls within the output color gamut, and carrying out color gamut conversion of input image data according to the set color gamut conversion condition. The setting unit sets a limiting condition for the color gamut conversion. The pre-processing unit changes the color value of specified color(s) so that the color value of the specified color(s) out of the input image data are converted by color gamut conversion by the color gamut conversion unit to an output corresponding color satisfying the limiting condition set through the setting unit, and for pre-processing so as to change the color values of colors other than the specified color(s) of the input image data according to the relationship between the color value before change of the specified color(s) and the color value after change of the specified color(s).

BRIEF DESCRIPTION OF THE DRAWINGS

Exemplary embodiments of the present invention will be described in detail based on the following figures, wherein.

DETAILED DESCRIPTION

Figure 1:
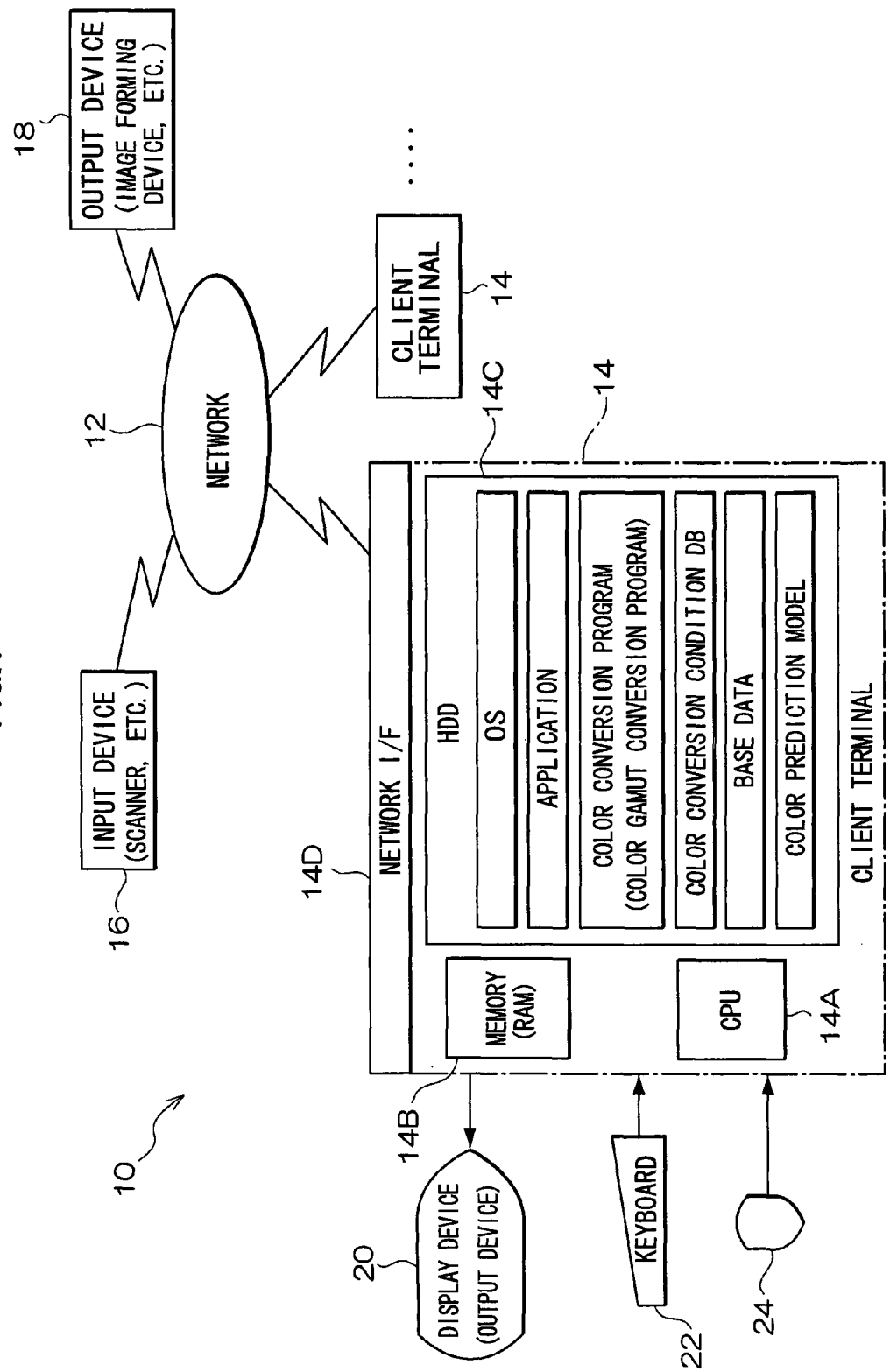
FIG. 1 is a block diagram showing a schematic configuration of a computer system in an exemplary embodiment of the present invention.

An exemplary embodiment of the invention is specifically described below by referring to the accompanying drawings. FIG. 1 shows an outline configuration of a computer system 10 according to the exemplary embodiment. The computer system 10 includes plural client terminals 14 composed of personal computers, an input device 16 for inputting an image (data) to the computer system 10, and an output device 18 for visually displaying the input data from the computer system 10 as image, all connected to a network 12 such as a LAN. The input device 16 is, for example, a scanner for reading a document and outputting image data, and the output device 18 is an image forming device for printing the image of input data on paper (such as printer, or combined machine of printer with function as a copier or a facsimile apparatus). The network 12 may be connected to a computer network such as the Internet.

The individual client terminals 14 connected to the network 12 include a CPU 14A, a memory 14B such as RAM, a hard disk drive (HDD) 14C, and a network interface (I/F) 14D, and are connected to the network 12 by way of the network I/F 14D. The client terminal 14 also includes a display device 20 as an output device, and keyboard 22 and a mouse 24 as input units. The input device 16 such as scanner and output device 18 such as image forming device may be also connected directly to the client terminal 14 same as the display device 20. Examples that may be given of the input device 16 include, aside from a scanner, a digital still camera, but such a digital still camera is directly connected to the client terminal 14.

The HDD 14C of the client terminal 14 stores in advance a program of an operating system (OS), various application programs operating on the OS and using the input device 16 and output device 18, and a color conversion program for processing color conversion, described below, in the client terminal 14, and a color conversion condition database (DB) for registering color conversion programs such as profiles used in color conversion process, a color prediction model, and other databases are also installed in advance.

Figure 2:
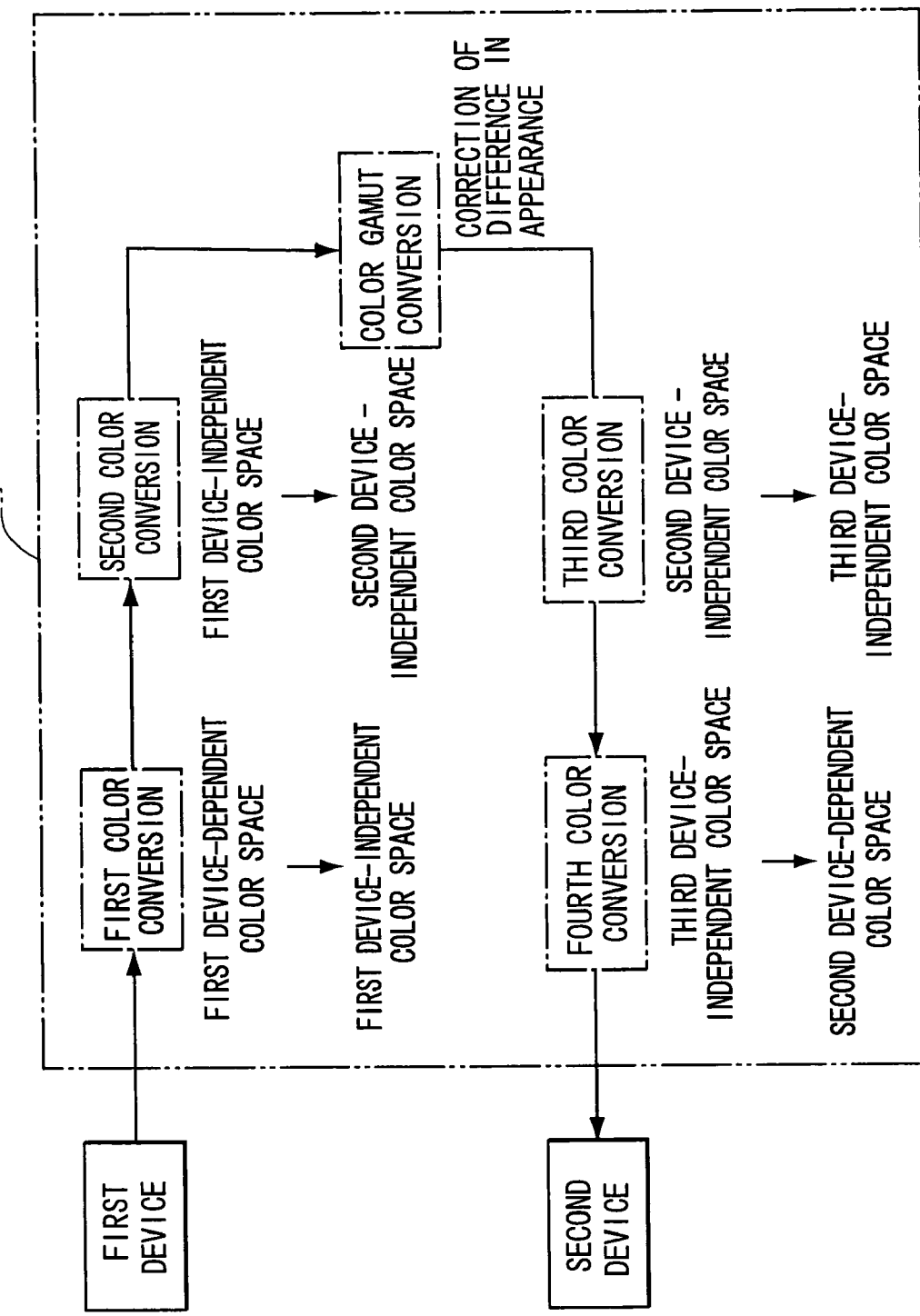
FIG. 2 is a schematic diagram showing a flow of color conversion processing in an exemplary embodiment of the invention.

The operation of the exemplary embodiment is explained. In the client terminal 14 of the exemplary embodiment, when the image data inputted from a certain input device 16 or the image data used in output of image in a certain output device 18 is used in output of image in other device (output device 18), color conversion is processed for correcting the difference in appearance of color of the image reproduced or incorporate in a different device (see FIG. 2). In FIG. 2, the input device 16 receiving the image data, or the output device 18 first outputting the image is called a first device, and the output device 18 outputting the image later (the output device 18 as object of image data output) is called a second device.

As shown in FIG. 2, the color conversion process of the exemplary embodiment includes processes of first color conversion, second color conversion, third color conversion, and fourth color conversion. The image data inputted in the client terminal 14 from the first device, or the image data used in the output of image in the first device is the image data expressing the color of individual pixels of the image data by the color value in the first device-dependent color space (first device-dependent color space: RGB color space if the first device is, for example, a scanner, digital still camera, or display device 20), and in the color conversion process of the exemplary embodiment on the image data, the first color conversion is executed, that is, the color value on the first device-dependent color space is converted into a color value that is a color value in the color space not depending on a specific device (first device-independent color space). In the following explanation, an L*a*b* color space or a CIEXYZ color space is favorable as the first device-independent color space.

Next, the image data after the first color conversion is processed by carrying out a second color conversion, by converting the color value in the first device-independent color space into a color value in a color space suited to color gamut conversion not depending on a specific device (the second device-independent color space). The second device-independent color space is desirably a color space expressing the appearance of color from which the effects of observation conditions has been eliminated, for example, a color space JCh defined by CIECAM02, a color appearance model, or a color space Jab determined from the color space JCh. The color attribute values a, b of Jab color space correspond to ac, bc generated from color attribute values C, h of JCh color space, and are characterized by hue and saturation being mutually convertible therebetween. In place of the color appearance model CIECAM02, a color appearance model such as CIECAM97s and CIECAM02 changed to uniform equivalent color space CAM02-US (uniform color spaces based CIECAM02 color appearance model (p. 320-330), M. Ronnier Luo, Guihua Cui, Changjun Li, 2006) or the like may be used. The second device-independent color space corresponds to a predetermined color space in the invention.

Subsequently, the image data after the second color conversion is processed by color gamut conversion (also known as Gamut mapping), by correcting the difference in appearance of an image in the first device and appearance of the image in the second device (this difference in appearance is attributable to differences in the color gamuts of the first device and second device). Details of the color gamut conversion in the exemplary embodiment are described later.

The image data after the color gamut conversion is processed by carrying out a third color conversion, by converting the color value in the second device-independent color space into a color value in another color space not depending on a specific device (the third device-independent color space: for example, L*a*b* color space). The image data after the third color conversion is processed by carrying out a fourth color conversion thereon, by converting the color value in the third device-independent color space into a color value on the second device-dependent color space (the second device-dependent color space: for example, RGB color space if the second device is the display device 20, or CMYK color space if the second device is an image forming device). The image data obtained after these processes of color conversion is output to the second device, and is presented to the output of image in the second device, and the appearance of color of the image output by the second device may be matched with that of the first device.

The color conversion program installed in the HDD 14C of the client terminal 14 includes programs for executing these processes of color conversion (first color conversion program for processing first color conversion, second color conversion program for processing second color conversion, color gamut conversion program for processing color gamut conversion, third color conversion program for processing third color conversion, and fourth color conversion program for processing fourth color conversion), and each color conversion process is executed by calling up in addition sequentially the first color conversion program, second color conversion program, color gamut conversion program, third color conversion program, and fourth color conversion program, and processing sequentially. In FIG. 1, the color conversion program is shown separately from the OS program, however the color conversion program may be included in the OS program as a standard program of OS. The color gamut conversion program out of these programs corresponds to the color processing program of the invention.

Of these color conversion processes, the second color conversion and third color conversion are formulated, and color conversion can be executed merely by putting an input color value in the color conversion formula, and calculating an output color value. However the first color conversion, fourth color conversion, and color gamut conversion must be executed by generating conversion conditions as required. First, the first color conversion and fourth color conversion are explained below.

Figure 3:
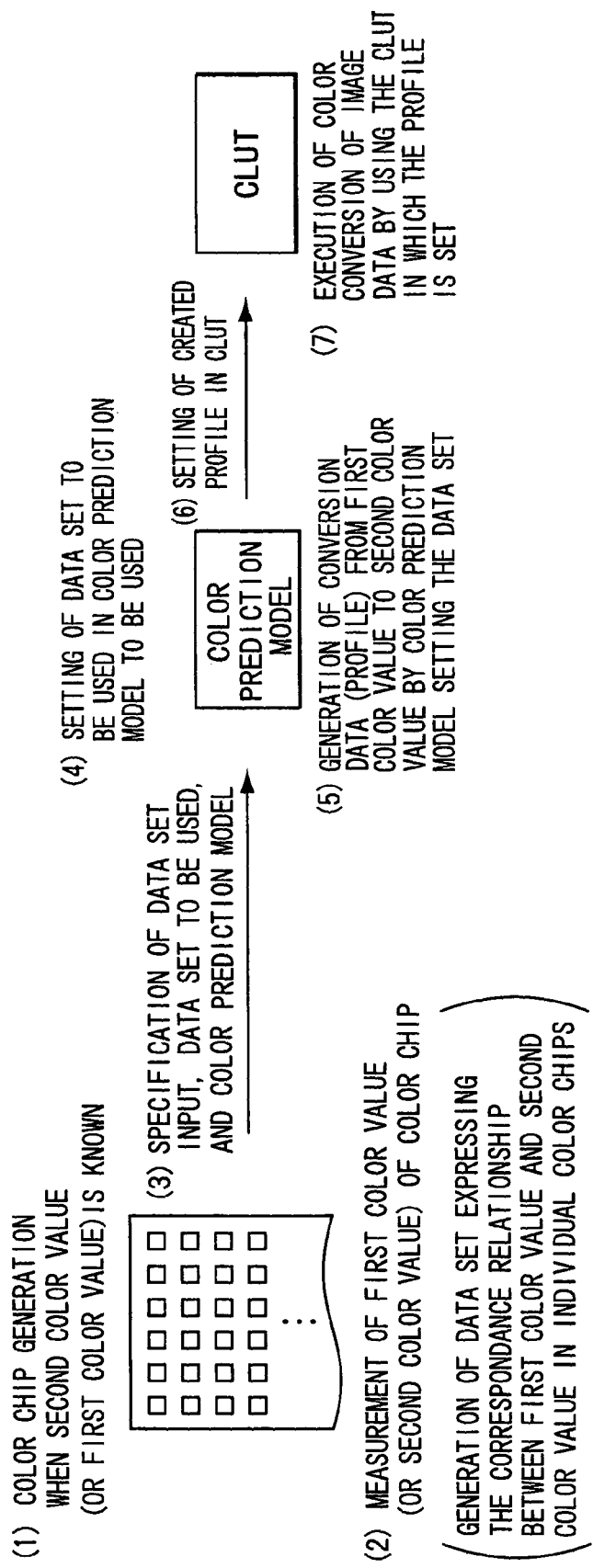
FIG. 3 is a schematic diagram showing a flow of the first/fourth color conversion process in color conversion processing.

The first color conversion and fourth color conversion are processed by setting the conversion data (profile) for converting an input color value into an output color value in a CLUT (color look-up table), and sequentially inputting the image data to be converted (image data expressing the color of each pixel by a color value) into the CLUT. To convert the color value at higher accuracy, a gradation table or a gamma curve may be added, and for example, a one-dimensional look-up table may be added to other pre-process or post-processing other than the CLUT. Further, the CLUT may be created by including such information. A profile can be generated as shown in FIG. 3 (1), in which a color patch (color chip) known in either input color value or output color value is created (for example, when creating a profile for fourth color conversion in the case of output of image data to an image forming device as the second device, a color chip is generated by printing the color chip of known output color values using a printer, or when creating a profile for fourth color conversion in the case of output of image data to a display as the second device, a color chip is generated by displaying the color chip of known output color values on the display), in each created color chip, the unknown color value of either the input color value or the output color value is measured by a color meter, and the corresponding data of input color value and output color value is obtained in each color chip, and this data is used as the profile.

In this generating method, a tremendous amount of color chips must be formed (the same number as the number of lattice points in the CLUT), and the input color value or output color value must be measured for the tremendous number of color chips, and an enormous labor is needed for profile making. As another method for profile making, for example, a color prediction model is used. A color prediction model is a program for receiving an input color value for which the corresponding output color value is unknown, and on the basis of base data showing the corresponding relations of a smaller number of input color values and output color values, estimation and calculations of the output color value corresponding to the received input color value are made using various algorithms, and then output. In profile making by using a color prediction model, a smaller number color chips (color chips with known input color value or output color value) than in the case of creating a profile directly from color chips are created (see also (1) in FIG. 3), and by calculating the unknown color value of the input color value or the output color value for each created color chip, the base data showing the corresponding relations between input color values and output color values for each color chip is generated (see also (2) in FIG. 3). Next, this base data is set in the color prediction model (see also (4) in FIG. 3), the input color values are sequentially inputted in the color prediction model, and output color values sequentially output from the color prediction model are correlated with the received input color values, and the profile is created (see also (5) in FIG. 3). By setting the created profile in the CLUT (see also (6) in FIG. 3), the color conversion (first color conversion or fourth color conversion) is executed by the CLUT.

In profile making by using the color prediction model, the number of color chips necessary can be substantially reduced than compared with the case of making the profile directly from color chips, and the effort for profile making may be substantially reduced. In this exemplary embodiment, the conversion condition (profile) of first color conversion and fourth color conversion may be generated by either one of the two methods explained above, however, the method of using the base data and a color prediction model is preferable.

Figure 4:
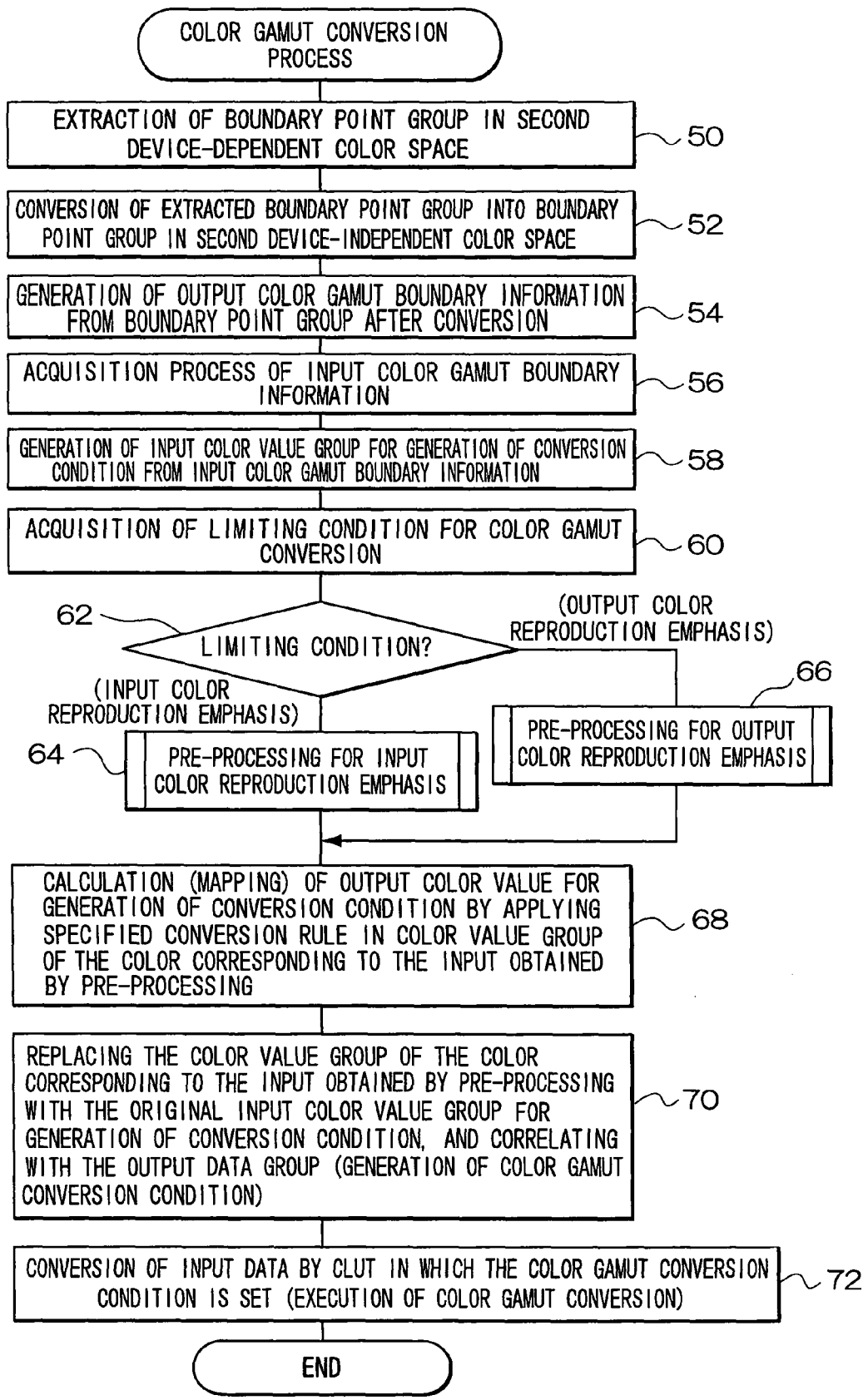
FIG. 4 is a flowchart showing color gamut conversion processing.

The color gamut conversion process in the exemplary embodiment is described by referring to FIG. 4. This color gamut conversion process is realized by processing the color gamut conversion program with the CPU 14A of the client terminal 14.

Figure 5A:
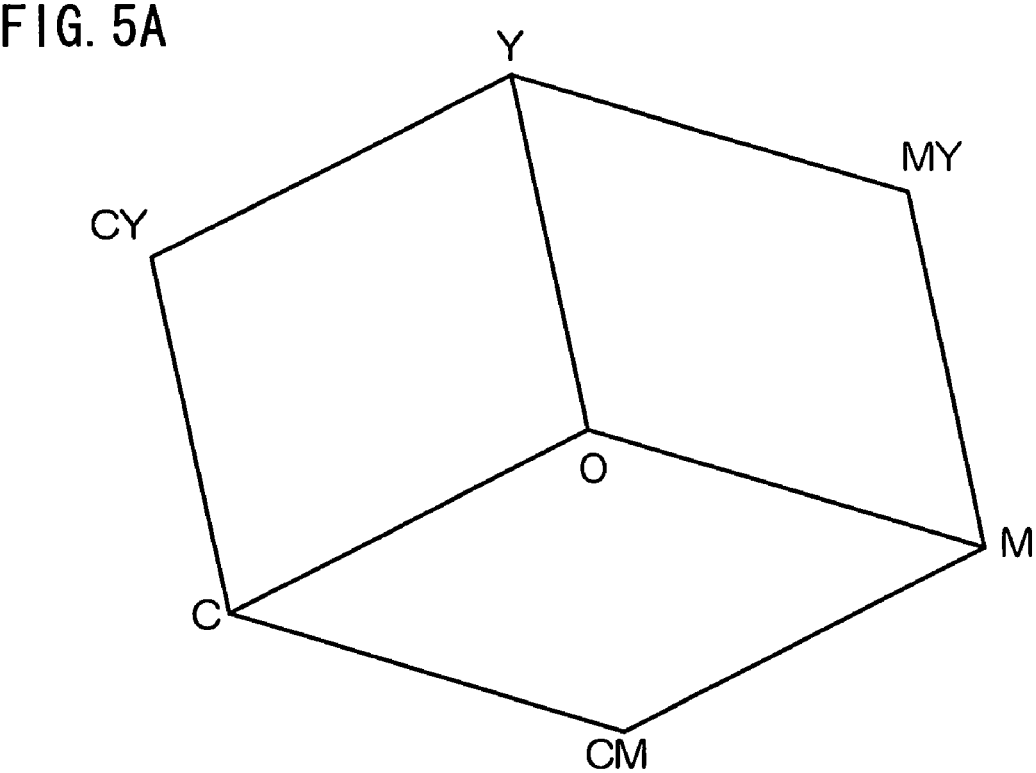
FIGS. 5A and 5B are schematic diagrams showing an example of color gamut boundary of a second device in a second device-dependent color space.
Figure 5B:
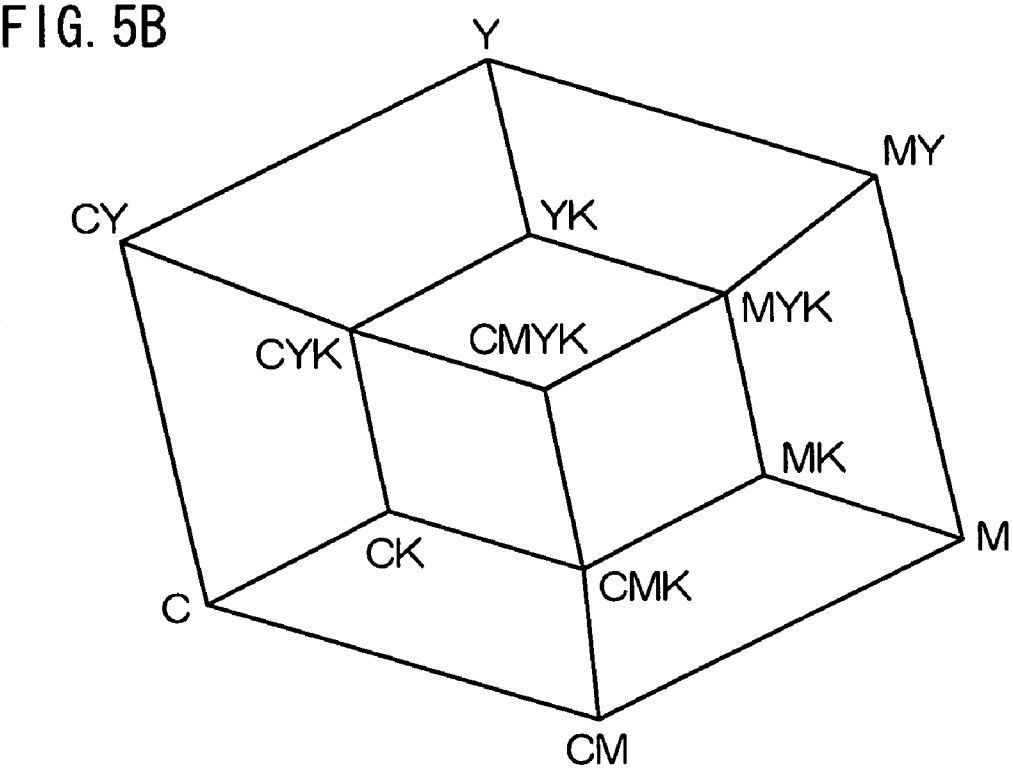

At step 50, points (points on a boundary plane) for composing the color gamut boundary (the boundary of the color reproduction region) of the second device in the second device-dependent color space are extracted as a boundary point group. For instance, when the second device is an image forming device, an example of a color gamut boundary in the image forming device in color space depending on the image forming device (CMYK color space) is shown in FIGS. 5A and 5B. FIG. 5A shows the top side portion of color gamut boundary on the CMYK color space, and FIG. 5B shows the bottom side portion respectively, and the overall structure of the color gamut boundary of the image forming device in CMYK color space is a polyhedron consisting of 12 sides combining the solid structures shown in FIG. 5A and FIG. 5B. At step 50, arbitrary points on the color gamut boundary plane of the second device can be extracted as a boundary point region, however it is desired to extract at least the points corresponding to each apex of color gamut boundary, and the points corresponding to the sides linking the apex points of color gamut boundary as a boundary point group. The intervals between the boundary points extracted from the sides, or the apexes or the planes other than at the sides may be either even or uneven.

Figure 6:
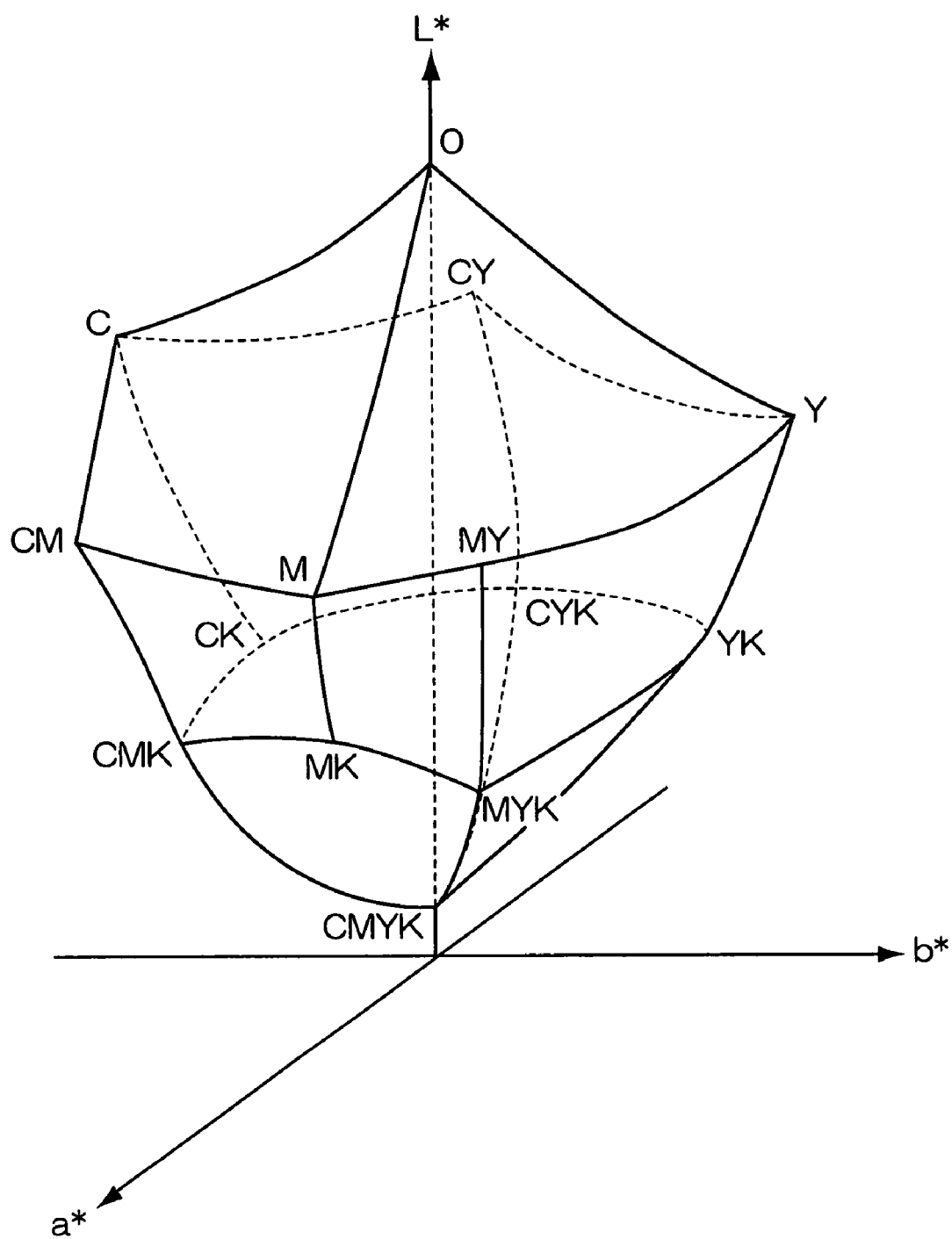
FIG. 6 is a schematic diagram showing an example of a color gamut boundary (output color gamut) of a second device in non device dependent color space.

At step 52, the color value of the boundary point group extracted at step 50 (the boundary point group expressing the color gamut boundary of the second device in the second device-dependent color space) is first converted into color values in the third device-independent color space (reverse conversion of the fourth color conversion in FIG. 2), and is further converted into color values in the second device-independent color space (reverse conversion of third color conversion in FIG. 2), and thereby the boundary point group expressing the boundary of the second device color gamut (output color gamut) in the second device-independent color space is determined. FIG. 6 shows an example of a color gamut boundary composed of a boundary point group after conversion at step 52 (the color gamut boundary of the second device in the second device-independent color space). In FIG. 6, each apex of the color gamut boundary is identified with same reference numeral as the apex corresponding to each apex of the color gamut boundary shown in FIGS. 5A and 5B. By this processing, the boundary point group for composing the color gamut boundary of the second device in the second device-independent color space can be obtained.

At step 54, the boundary point group obtained by the conversion at step 52 linked as the apex, the boundary plane is generated by interpolation to form a polygon (polyhedron), thereby generating output color gamut boundary information expressing the color gamut boundary of the second device in the second device-independent color space as a polyhedron. As a result, on the basis of the generated output color gamut boundary information, for example, by evaluating or quantitatively determining the color gamut boundary of the second device on the second device-independent color space, or by visualizing three-dimensionally the color gamut boundary of the second device in the second device-independent color space by utilizing a general visualizing tool, the color gamut boundary of the second device in the second device-independent color space can be easily utilized in various applications.

When generating the output color gamut boundary information at step 54, for example, of the boundary point group obtained by conversion at step 52, boundary points suited to the desired application may be selectively extracted, a part of the boundary point group extracted joined and the boundary plane may be generated by interpolation or the like, thereby generating the output color gamut boundary information. Alternatively, the output color gamut boundary information may be generated in advance and stored in the HDD 14C, and merely be read out, and the output color gamut boundary information may be acquired thereby. The output color gamut boundary information corresponds to the output color gamut information of the invention.

At step 56, input color gamut boundary information expressing the color gamut boundary (input color gamut boundary) of the first device (see FIG. 2) in the second device-independent color space is acquired. The input color gamut boundary information is generated, in the same way as explained at step 50 to step 54, for example, by extracting a boundary point group for composing the color gamut boundary of the first device in the first device-dependent color space, converting the color value of the extracted boundary point group into a color value in the second device-independent color space, determining the boundary point group expressing the color gamut boundary of the first device in the second device-independent color space, joining the apexes of the determined boundary point group, and generating the boundary plane by interpolation or the like to form polygon (polyhedron). Alternatively, the input color gamut boundary information may be generated in advance and stored in the HDD 14C, and merely be read out, and acquired thereby.

At step 58, on the basis of the input color gamut boundary information acquired at step 56, data of multiple points located at mutually different positions in the input color gamut in the second device-independent color space is generated as input data group for generating conversion condition. At step 60, the limiting condition corresponding to this color gamut conversion is acquired. The limiting condition can be acquired, for example, by displaying a limiting condition selection screen showing plural choices of limiting condition and showing a message requesting selection from each choice on the display device 20, selecting the choice by the user using either the keyboard 22 or mouse 24, and determining the choice (limiting condition) selected by the user. If the choice is selected in advance by the user through the keyboard 22 or mouse 24, and the information showing the selected choice (limiting condition) is stored in the HDD 14C, the limiting condition can be obtained by reading the information from the HDD 14C. The keyboard 22 and mouse 24 of the exemplary embodiment correspond to the setting unit in the invention.

Figure 7:
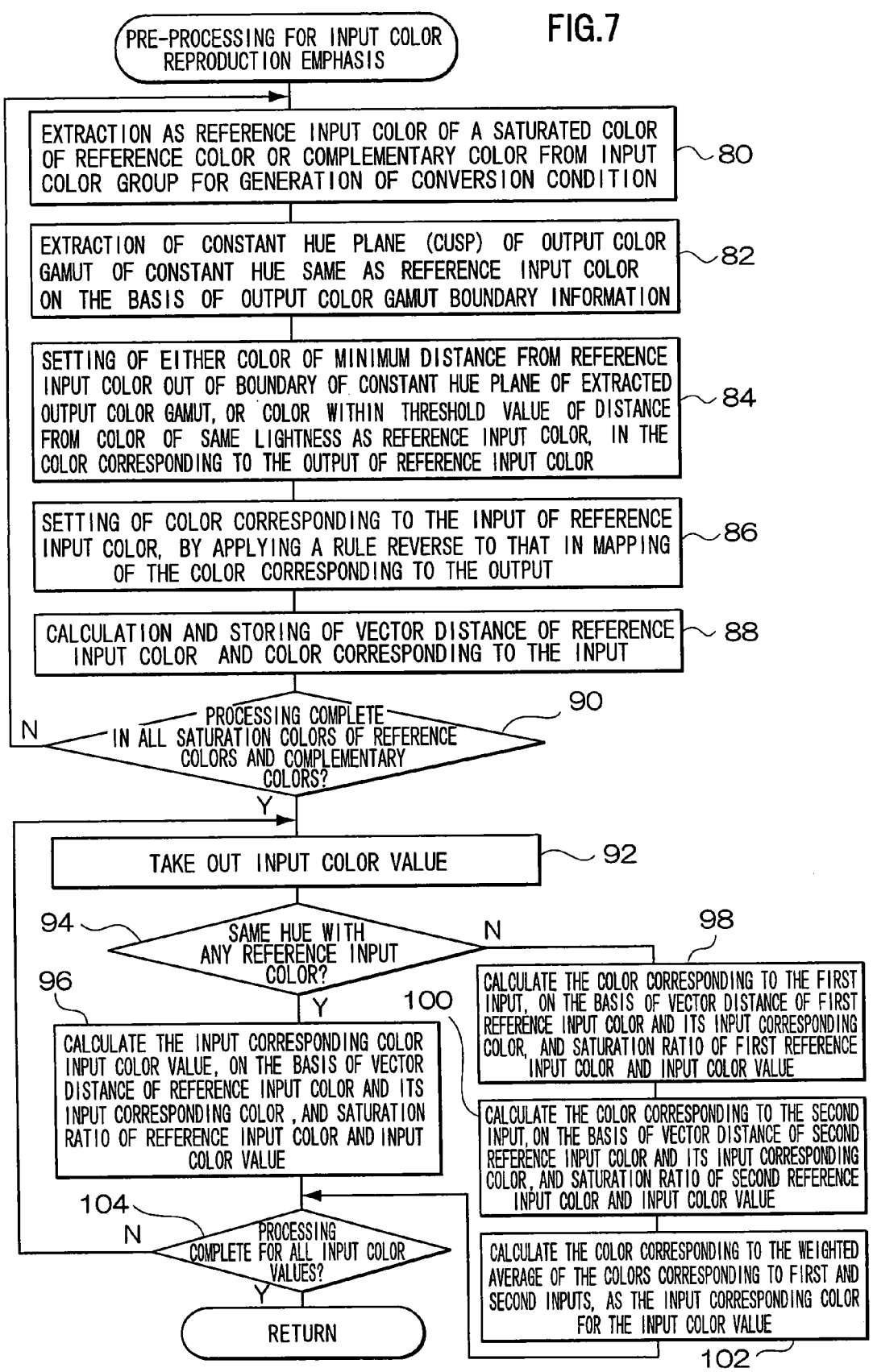
FIG. 7 is a flowchart showing pre-processing for emphasizing the input color reproduction.

When the limiting condition is acquired at step 60, consequently, at step 62, the acquired limiting condition (the limiting condition about the color gamut conversion) is determined, and the process branches according to the determined result. In the exemplary embodiment, the limiting condition of color gamut conversion includes "input color reproduction emphasis" mode and "output color reproduction emphasis mode". If the limiting condition of color gamut conversion is "input color reproduction emphasis" mode, going to step 64, input color reproduction emphasis is pre-processed, and if the limiting condition of color gamut conversion is "output color reproduction emphasis" mode, going to step 66, output color reproduction emphasis is pre-processed. First, referring to FIG. 7, the input color reproduction emphasis pre-process is explained.

In input color reproduction emphasis pre-process, first at step 80, from the input color value group for generating conversion condition generated at step 58 for color gamut conversion process (FIG. 4), the color value of saturated color, of either a reference color for defining the second device-dependent color space (primary color) or a complementary color (secondary color), is extracted as the color value of reference input color used in the following process. For example, when the second device is an image forming device, and the second device-dependent color space is a CMYK color space, primary colors are C, M, Y, K, and secondary colors are R, G, B. At step 80, the color value of any saturated color of C, M, Y, K, R, G, B is extracted as color value of a reference input color. In place of the reference colors and complementary colors for defining the second device-dependent color space, reference colors and complementary colors for defining the first device-dependent color space may be used. The reference input color corresponds to the predetermined color in the invention.

Figure 8A:
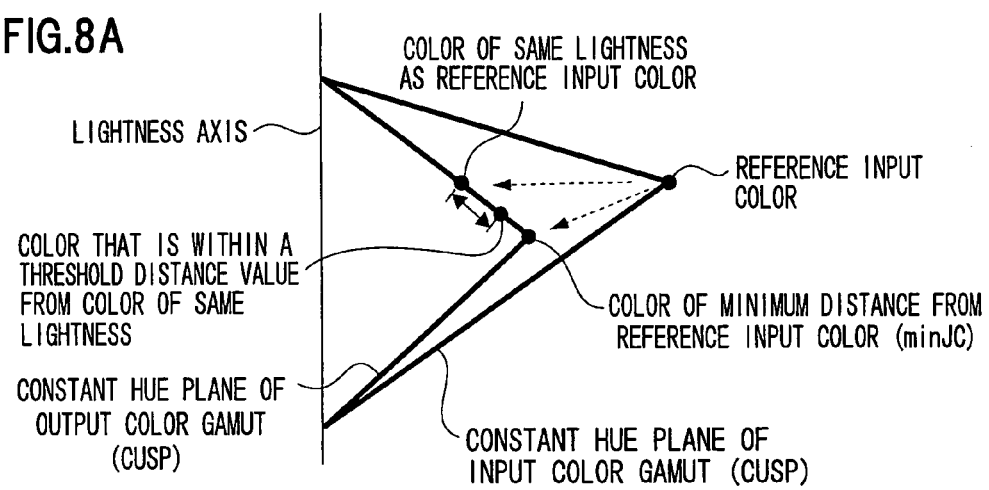
FIGS. 8A, 8B and 8C are schematic diagrams showing details of the pre-processing in FIG. 7.

At step 82, on the basis of the output color gamut boundary information, an equal hue plane is extracted of an output region that is of constant hue same as the reference input color that was extracted at step 80 (CUSP: see, for example, also FIG. 8A). At the next step 84, of the color values on the boundary of the equal hue plane in the output color gamut of constant hue same as the reference input color extracted at step 82, the color value of minimum distance to the reference input color extracted at step 80 (the color value corresponding to the first color value; see also the color of minimum distance (minJC) from the reference input color shown in FIG. 8A) is set as the color value of the color corresponding to the output of reference input color. The color corresponding to the output is not limited to this example alone, and by determining the color value of the same lightness as the reference input color on the boundary of equal hue plane extracted at step 82, the color value within a threshold value of the distance from the color value of equal lightness on the boundary of the equal hue plane (the color value corresponding to the second color value: see also the color within threshold value of distance from the color of equal lightness shown in FIG. 8A) may be set as the color value of the color corresponding to the output of reference input color.

Furthermore, without undertaking extraction of the equal hue plane of the output color gamut that has the constant hue same as that of the reference input color (step 82), the color value that is positioned on the boundary of the output color gamut in the second device-independent color space, and that has the minimum vector distance (as this vector distance the color difference, or a predetermined evaluation coefficient for expressing the distance in second device-independent color space, may be used) to the reference color in the second device-independent color space (a color value that corresponds to the third color value) may be determined and this color value set as the output corresponding color value of the reference input color.

Also, as the output corresponding color for the reference input color, a color value may be used that is selected within the triangular shaped color range in the second device-independent color space (a color value corresponding to the "color value within the triangular shaped color range") that has as its apexes each of the above first color value, second color value and third color value ("a first color value that is on the boundary of the output color gamut and that has the minimum distance in the specified color space to color values of equal hue to the color value of the specified color", "a second color value that is on the boundary of the output color gamut, that is a color of equal hue to the color value of the specified color, and, and that is within a threshold value of distance in the predetermined color space from a reference color value of equal lightness to the color value of the specified color", and "a third color value that is on the boundary of the output color gamut and that has a minimum vector distance to the color value of the specified color in the predetermined color space"). For such a color value examples that may be mentioned are a value that is on a line connecting two chosen color values (for example, the first color value and the second color value) from the first to the third color values in the second device-independent color space (for example a color value that is equivalent to the average of the two color values), and a value that is at a selected position within the triangular shaped color range defined using the first to the third color values (for example a color value that is equivalent to the average of the first, second and third color values).

Furthermore, the output corresponding color for the reference input color may be switched, between any one of the above first color value to third color value and the color value within the triangular shaped color range, according to the color value of the reference input color (for example the hue thereof). By doing so, optimization may be made of the color value of the output corresponding color for the reference input color depending on the color value of the reference input color (on the hue thereof or the like). Regarding the manner of switching the output corresponding color of the reference input color according to the color value of the reference input color, this may be, for example, decided on the basis of the results of experimentation or the like that is carried out in advance, however, the third color value is preferably used as the output corresponding color for the reference input color at least when the reference input color has a hue that is within the range b*<0 in CIEL*a*b* color space.

Also, when setting the output corresponding color for the reference input color, at least when the third color value is used as described above, or in other cases when this possibility exists (that is to say, in pre-processing emphasizing input color reproduction the possibility exists when the third color value is fixed as the output corresponding color for the reference input color, cases when the third color value is one of the options included when switching color values used as the output corresponding color for the reference input color, and cases when a color value that is within the triangular shaped color range that has been determined on the basis of plural color values that include the third color value is used), it is preferable that range adjustment processing is carried out for adjusting the color value of the image data (at least the lightness thereof) according to the output color gamut or according to the image output condition, and that the same range adjustment processing is incorporated into the color gamut conversion condition (integrated conversion condition) used in changing the image data for output.

The above range adjustment processing may be, for example, range adjustment processing so as to adjust the color values of the image data used in generating the conversion condition such that the highest and the lowest values of lightness of the image data used in generating the conversion condition match the highest and lowest values of lightness in the second device-independent color space, or it may be, for example, when the output device 18 according to the present exemplary embodiment (the second device) is an image forming apparatus, processing to adjust the color values of image data used in generating the conversion condition, adjusting such that image data obtained through color conversion processing (first color conversion, second color conversion, color gamut conversion, third color conversion, fourth color conversion) so that the white color of image data used for generating the conversion condition matches a particular paper (base color) when a particular paper is used for recording an image. Furthermore, the above range adjustment processing may be undertaken at the same time as the first color conversion or the second color conversion, or undertaken in the middle of color gamut conversion according to the present exemplary embodiment (FIG. 4). The above range adjustment processing is performed such that a conversion condition that realizes more appropriate color gamut conversion may be obtained.

At step 86, the color corresponding to the output determined at step 84 is converted by applying a reverse conversion rule to the conversion rule applied when setting (mapping) the color gamut conversion described below (reverse conversion of conversion (color gamut conversion) applying the conversion rule applied when setting the color gamut conversion condition), and the color value of color corresponding to input of reference input color (see also FIG. 8B) is determined. At step 88, calculating the vector distance (see also FIG. 8B) of the reference input color and the color corresponding to input determined at step 86, the calculated vector distance is stored in the HDD 14C by correlating between the reference input color and the color value of the color corresponding to the input. At next step 90, it is determined if processes of steps 80 to 88 are all finished for saturated colors of all reference colors and complementary colors. When determined negative, the process returns to step 80, steps 80 to 90 are repeated until determined affirmative at step 90. As a result, saturated colors of all reference colors and complementary colors are set as reference input colors, and the colors corresponding to outputs and colors corresponding to inputs are set, and vector distances to colors corresponding to the inputs are calculated and stored.

As described below, when "input color reproduction emphasis" mode is selected as the limiting condition in color gamut conversion, the reference input color is pre-processed by converting the color value into a color value of the color corresponding to the input determined at step 86, however, as mentioned above, since the color corresponding to the input is determined by reverse color gamut conversion on the color corresponding to the output determined at step 84, the reference input color is changed through pre-processing to a color value (color corresponding to the input) to be converted into the color corresponding to the output through the color gamut conversion. The color values determined at Step 84 as the color corresponding to the output after the color gamut conversion (color values equivalent to the first color value, or color values equivalent to the second color value) are in constant hue same as the reference input color, and are small in their difference in lightness and saturation from the reference input color, and since they are color values positioned on the boundary of the output color gamut, they are color values that satisfy the limiting conditions of input color reproduction emphasis, and when the reference input color is changed to the color corresponding to the input through pre-processing, and is further changed to the color corresponding to the output through the color gamut conversion, color gamut conversion is carried out on the reference input color that satisfies the limiting condition of input color reproduction emphasis.

It should be noted that in the input color value group for generating the conversion condition, the color values of saturated colors of reference colors and/or complementary colors for defining the second device-dependent color space (color values of the reference input colors) are, in most cases, color values that protrude outside of the output color gamut in the second device-independent color space, but there are occasions when they initially fall within the output color gamut in the second device-independent color space. Now, regarding reference input colors that initially fall within the output color gamut in the second device-independent color space, if the output corresponding color and the input corresponding color are derived sequentially as described above, and pre-processing is carried out changing the color values of the reference input colors and colors in the color regions in the vicinity thereto, according to the vector distance between the reference input colors and the input corresponding colors, and then, by furthermore carrying out color gamut conversion, the reference input colors are converted into output corresponding colors, and the colors in the color regions in the vicinity of the reference input colors are changed to colors based on these, then a problem may arise that the color gamut in the region of the reference input colors is expanded unnaturally by the pre-processing, and appropriate color reproduction becomes unobtainable.

Considering this, in the pre-processing in the above steps 80 to 90, it may be configured such that, for example, after the color values of saturated colors of the reference colors and/or the complementary colors thereof for defining the second device-dependent color space have been extracted from the group of input color values for generating the conversion condition, it may be determined whether or not the extracted color values of the reference input colors fall within the output color gamut in the second device-independent color space, and when negative (when the color value of the reference input color does not fall within the output color gamut) then the processing from step 82 onwards is carried out, but on the other hand, if the determination is affirmative, then the color value of the reference input color is set to the color value of the input corresponding color of the reference input color as it is, and also the vector distance between the reference input color and the input corresponding color is set to 0, and after these have been correlated and stored in the HDD 14C, step 82 to step 88 are skipped and the determination of step 90 is carried out. By so doing, since substantially no pre-processing is carried out to the color values of the reference input colors that fall within the output color gamut in the second device-independent color space, or to the color gamut in the vicinity thereto, the color gamut is not expanded unnaturally by pre-processing and the color gamut is preserved, enabling appropriate reproduction of colors of the reference input colors and colors in the color regions in the vicinity thereto.

Furthermore, when the color values of the reference input colors fall within the output color gamut in the second device-independent color space, in place of the steps 82, 84, after processing to set the color value of the reference input colors as they are to the color values of the output corresponding colors of the reference input colors, the flow may proceed to step 86 and the input corresponding colors for the reference input colors set, and then processing to compute the vector distances and the like may be carried out. In such a case, there is in addition, as well as no pre-processing, substantially no color gamut conversion carried out to color values of the reference input colors that fall within the output color gamut in the second device-independent color space, or to the color gamut in the vicinity thereto, and therefore appropriate color reproduction may be achieved of the reference input colors and the vicinity thereto.

When determined affirmative at step 90, the process proceeds to step 92, from the input color value group for generation of conversion condition generated at step 58 of color gamut conversion process (FIG. 4), a value is taken out from the input color values not extracted as reference input colors (color values of other saturated colors different from those of all the reference colors and the complementary colors). At next step 94, it is determined whether the input color value take out at step 92 is the same in hue as any one of the plural color values extracted previously as reference input colors.

When determined affirmative at step 94, the process proceeds to step 96, the vector distance $D_0$ of the color value that is the constant hue same as the input color value taken out at step 92 (reference input color of constant hue) and the color corresponding to the input is read out from the HDD 14C, and the obtained vector distance is multiplied by the ratio of saturation C of the input color value to saturation $C_0$ of the reference input color of constant hue, and the vector distance D of input color and color corresponding to the input is calculated (see formula below), and the color value of the color corresponding to the input of the input color value is calculated according to the calculated vector distance, and the process goes to step 104.

$$D=D_0 \times (C/C_0)$$

Figure 8B:
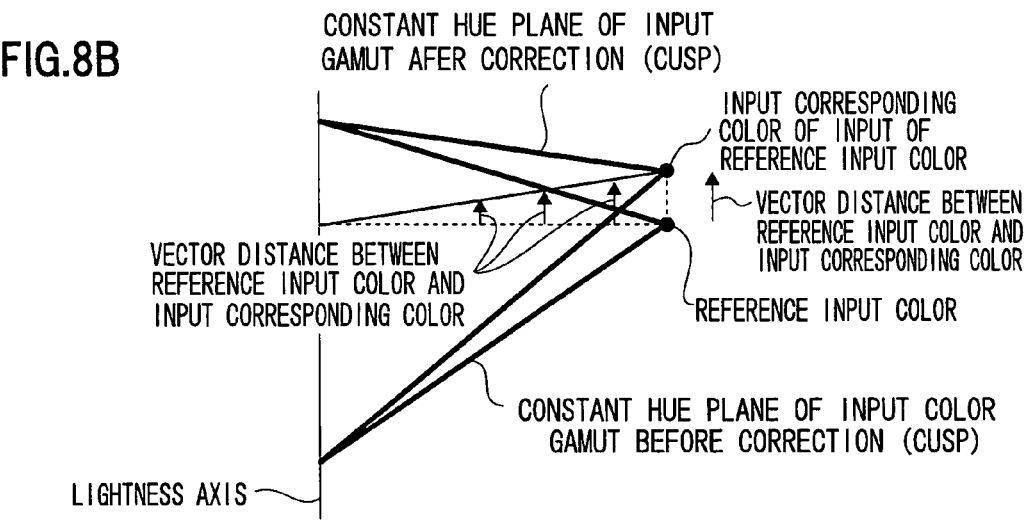

As a result, of the input color values taken out from the input color value group for generating the conversion condition, an input color value of constant hue same as any one of the plural color values extracted as reference input color is calculated by the vector distance between the reference input color and the color corresponding to the input, and the color value having the vector distance reduced according to the ratio of saturation of the reference input color and the input color value (see, for example, also "the vector distance between the input color value and the input corresponding color" in FIG. 8B) is calculated and set as the color corresponding to the input.

On the other hand, if there is no color value that is the same in hue as the input color value taken out at step 92 among the plural color values extracted previously as reference input colors, the determination at step 94 is negative, and the process goes to step 98. In the following explanation, for the sake of convenience, of the plural color values extracted as reference input values, as shown in FIG. 8C, the color value of the closest hue to the hue of the input color value clockwise from the center of axis of lightness of second device-independent color space (the color value corresponding to the first specified color) is called a first reference input color, and the color value of the closest hue to the hue of the input color value counterclockwise from the center of axis of lightness (the color value corresponding to the second specified color) is called a second reference input color.

At step 98, of the plural color values extracted as reference input colors, the color value corresponding to the first referenced input color is determined, and the same as at step 96, the vector distance between the determined first reference input color and the color corresponding to the input is read out from the HDD 14C, and the obtained vector distance is multiplied by the ratio of saturation of input color value to saturation of first reference input color, and the vector distance of input color value and the first color corresponding to the input is calculated, and the color value of the first color corresponding to the input of the input color value is calculated on the basis of the calculated vector distance. At step 100, the same as at step 98, the color value corresponding to the second reference input color out of the plural color values extracted as reference input colors is determined, and the vector distance of the determined second reference input color and the color corresponding to the input is read out from the HDD 14C, and the obtained vector distance is multiplied by the ratio of saturation of input color value to saturation of second reference input color, and the vector distance of input color value and the second color corresponding to the input is calculated, and the color value of the second color corresponding to the input of the input color value is calculated on the basis of the calculated vector distance.

Figure 8C:
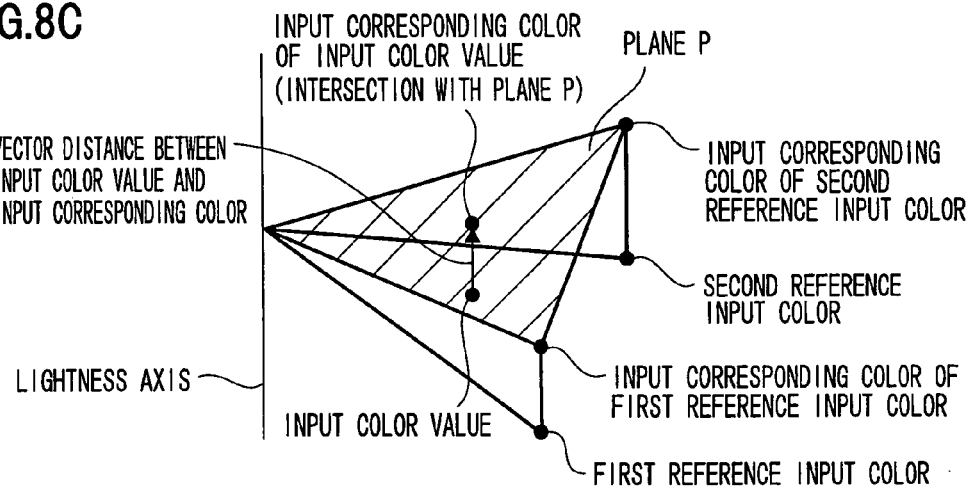

At step 102, the color corresponding to the weighted average of the color value of the first color corresponding to the input calculated at step 98, and of the color value of the second color corresponding to the input calculated at step 100 (the color corresponding to the intersection with plane P, as shown in FIG. 8C) is calculated as the color value of the color corresponding to the input of the input color, and the process goes to step 104. Weighting in the weighted average is calculated by using the ratio of hue difference between the input color value and the first color corresponding to the input, to the hue difference between the input color value and the second color corresponding to the input. As a result, of the input color values taken out from the input color value group for generation of the conversion condition, input color values not having color values that are the same in hue as any of the plural color values extracted as reference input values are calculated and the color value of the color corresponding to the input is determined on the basis of a vector distance that is the vector distance between the first reference color and the color corresponding to that input, reduced according to the ratio of saturation of the first reference input color to that of the input color value, and a vector distance equivalent to the weighted averages of the vector distance between the second reference input color and the color corresponding to that input, reduced according to the ratio of saturation of the second reference input color to that of the input color value (see, for example, also the vector distance between the input color value and the input corresponding color shown in FIG. 8C).

At step 104, it is determined whether or not the processes after step 92 have been executed or not on all the input color values other than the reference input colors of the input color value group for generation of conversion condition. When determined negative, the process returns to step 92, the processes of step 92 to step 104 are repeated until determined affirmative at step 104. As a result, for all input color values other than the reference input color values of the input color value group for generation of the conversion condition, the color values of the colors corresponding to input are calculated at step 96 and step 98 to step 102.

Thus, in the input color values other than the reference input color, color values of the colors corresponding to the input are calculated without calculating the color corresponding to the output, however, in the input color values other than the reference input color, for the colors corresponding to the input of the input color values having reference input colors that are of the constant hue, the color values are calculated on the basis of the relationship (vector distance) of the reference input color of constant hue and the color corresponding to that input. Also, in the input color values not having a reference input color of the constant hue, the color values are calculated on the basis of the relationship (vector distance) of a first reference input color of similar hue to the input color value and the color corresponding to that input, and on the basis of the relationship (vector distance) of a second reference input color of similar hue to the input color value and the color corresponding that the input. Therefore color values can be obtained by color region conversion for the colors corresponding to the inputs of the input color values other than the reference input colors such that there are no gaps between the color values after color gamut conversion of the reference input colors (the color values of colors corresponding to the output), and also, at the same time, estimations may be made for conversion into proper color values satisfying the conversion condition of the input color reproduction emphasis mode.

Color values of the colors corresponding to the input are calculated and determined for all input color values for composing the input color group for generation of conversion condition, and the color value group of the colors corresponding to the input is obtained, and when it is determined affirmative at step 104, and the pre-processing of input color reproduction emphasis mode is terminated, and the process goes to step 68 of color gamut conversion (FIG. 4). The color values of the colors corresponding to the input obtained for every input color value by the pre-processing (FIG. 7) of input color reproduction mode describe above correspond to the values after conversion by pre-processing for satisfying the limiting condition of input color reproduction emphasis mode on individual input color values, and the correlating condition of individual input color values and the color values of the colors corresponding to these inputs is equivalent to the pre-processing condition.

Figure 9:
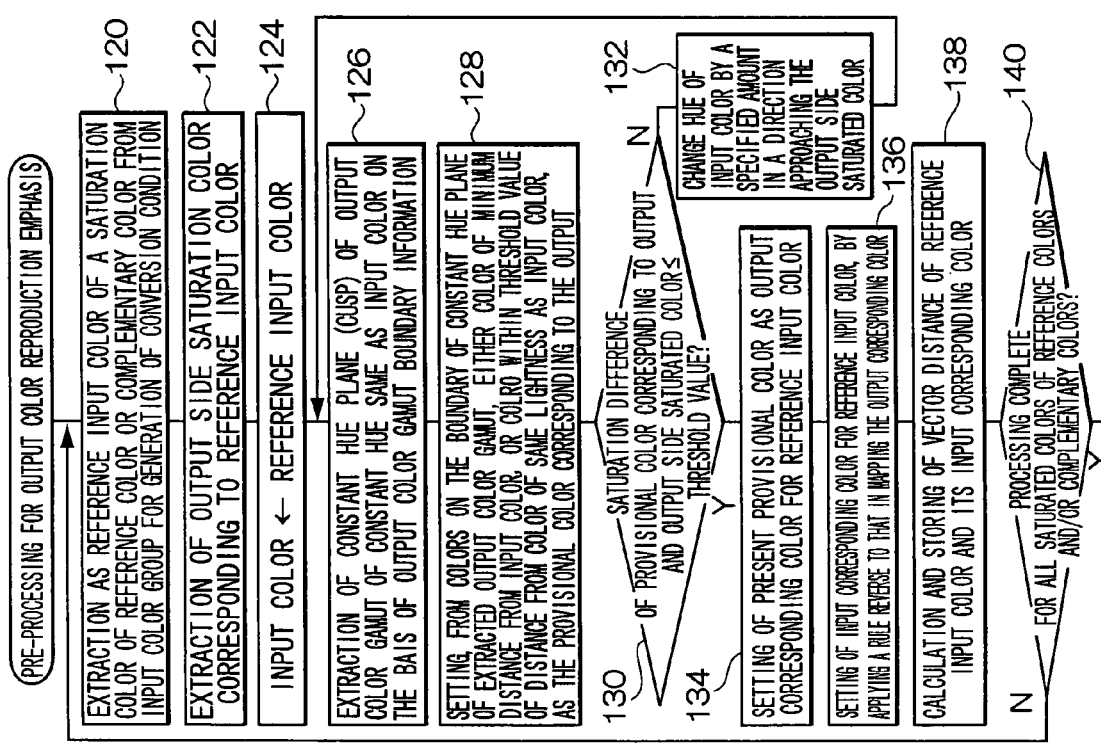
FIG. 9 is a flowchart showing pre-processing for emphasizing the output color reproduction.

Referring now to FIG. 9, the pre-processing of output color reproduction emphasis mode is explained. In the pre-processing of output color reproduction emphasis mode, first at step 120, from the input color value group for generation of the conversion condition, the color value of a saturated color of either a reference color or a complementary color for defining the second device-dependent color space is extracted as the color value of the reference input color. At next step 122, the color value of the saturated color of the output side corresponding to the reference input color extracted at step 120 is extracted (for example, if the reference input color is Y, and the second device is an image forming device, the color value of the saturated color of the output color gamut side corresponding to the reference input color is the color value of saturation color of Y in the output color gamut, that is, the color value corresponding to the color of maximum concentration that can be formed only by the coloring matter (toner or ink) of Y). At step 124, the color value of the reference input color extracted at step 120 is set as the color value of input color.

At step 126, on the basis of output color gamut boundary information, a constant-hue plane of the output color gamut as the hue of the input color setting the color value is extracted in advance (CUSP: see also FIG. 8A). At next step 128, from the color values on the boundary of the constant hue plane of the output color gamut as the hue of the input color extracted at step 126, the color value that has the minimum distance to the input color (the color value as a candidate of third color value: see also the color of minimum distance (minJC) from the reference input color shown in FIG. 8A) is determined as the color value of the provisional color corresponding to the output of reference input color. The provisional color corresponding to the output is not limited to this example alone, and by determining the color value of same lightness as the input color on the boundary of the equal hue plane extracted at step 126, a color value within a threshold value of distance from the color value of equal lightness on the boundary of the equal hue plane (the color value as candidate of a fifth color value: see also the color within a threshold value of distance from the color of equal lightness shown in FIG. 8A) may be set as the provisional color value of the color corresponding to the output of reference input color.

At step 130, it is determined whether the saturation difference is equal to or less than a threshold value or not, between the color value of the provisional output corresponding color of the reference input color, set at step 128, and the color value of the saturated color of output side extracted at step 122. It should be noted that, at step 128, the color value with the minimum distance to the input color may be calculated as the provisional first color corresponding to the output of the reference input color, and the color value that is within a threshold value of distance from the color value of same lightness as the input color on the boundary of the constant hue plane, and that is on the boundary of constant hue plane, may be calculated as the provisional second color corresponding to the output of reference input color, and in step 130 the provisional color corresponding to the output may use whichever of the above has the smaller saturation difference to that of the output side saturated color.

If determined negative, the process goes to step 132, the color value of the input color is changed so that the hue of the input color may be changed by a specified amount in a direction that approaches the output side saturated color (however, with lightness and saturation that is the same as in the reference input color), and then the process returns to step 126. Thus, the process of step 126 to step 132 is repeated until determined affirmative at step 130. When determined affirmative at step 130, the process goes to step 134, and the color value of the present provisional color corresponding to the output is set as the color value of the color corresponding to the output of the reference input color.

It should be noted that, when setting the output color corresponding to the reference input color, instead of the above described steps 126 to 132, in the same way as setting the third color value explained before, a color value for the output color corresponding to the reference input color may be set as the color value derived from the color value that has the smallest vector distance in the second device dependent color space from the reference input color and that is positioned on the boundary of the output color gamut in the second device dependent color space (a color value corresponding to the sixth color value).

Furthermore, the following may be used as the output color corresponding to the reference input color: a color value that is at a selected position in the second device-independent color space within the triangular shaped color range with each of the above fourth to sixth color values ("a fourth color value that is on the boundary of the output color gamut, and that is within a threshold value in saturation difference from the color value of the color on the output gamut side corresponding to the specified color, the fourth color value having a hue that is as close as possible to the hue of the color value of the specified color, and the fourth color value having the same lightness and saturation as the color value within the constant hue plane as the color value of the specified color that is a minimum distance to this point in the predetermined color space" or "a fifth color value that is on the boundary of the output color gamut, and that is within a threshold value in saturation difference from the color value of the color on the output gamut side corresponding to the specified color, the fifth color value being within a threshold distance in the predetermined color space from a reference color value that is on the boundary of the output color gamut of the constant hue plane as the specified color and having the same lightness as the color value of the specified color" or "a sixth color value that is on the boundary of the output color gamut and has the minimum vector distance in the predetermined color space to the color value of the specified color") at an apex thereof (a color value corresponding to the "color value that is within the triangular shaped color range"). Examples that may be mentioned for this color value are a value that is on a line connecting two chosen color values (for example, the fourth color value and the fifth color value) from the fourth to the sixth color values in the second device-independent color space (for example a color value that is equivalent to the average of the two color values), and a value that is at a selected position within the triangular shaped color range defined using the fourth to the sixth color values (for example a color value that is equivalent to the average of the fourth, fifth and sixth color values).

Furthermore, switching between which of the above fourth to sixth color values and the color value within the triangular shaped color range is used may be carried out according to the color value of the reference input color (for example the hue thereof). By doing so, the color value of the output corresponding color for the reference input color may be optimized according to the color value of the reference input color (the hue thereof or the like). Regarding the manner in which the switching is carried out of the output corresponding color of the reference input color according to the color value of the reference input color, for example this may be decided the basis of the results of prior experimentation, however, it is preferable that the sixth color value is used for the output corresponding color for the reference input color at least when the reference input color has a hue that is within the range of b*<0 in CIEL*a*b* color space.

Also, when setting the output color of the reference input color, at least when the sixth color value is used as described above, or in other cases when a possibility of its use exists (that is to say, in pre-processing emphasizing output color reproduction a possibility exists when the sixth color value is fixed to be used as the output corresponding color for the reference input color, cases when the sixth color value is one of the options included when switching color values used as the output corresponding color for the reference input color, and in cases when a color value that is within the triangular shaped color range that has been determined on the basis of plural color values that include the sixth color value is used), it is preferable that, before carrying out color gamut conversion processing according to the present embodiment of the present invention, the above range adjustment processing is carried out on the image data used for generating the conversion condition (for example, on the group of input color values used for generating the conversion condition), and that the same range adjustment processing is incorporated into the color gamut conversion condition (integrated conversion condition) used in changing the image data for output. This range adjustment processing also, by carrying out the above range adjustment processing on the image data used for generating the conversion condition, enables a conversion condition to be obtained that realizes even more appropriate color gamut conversion.

At step 136, by converting the color corresponding to the output set at step 134 by applying a conversion rule that is the reverse to the conversion rule applied when setting the color gamut conversion condition, the color value of the color corresponding to the input color of the reference input color is determined. At step 138, the vector distance is calculated between the reference input color and the color corresponding to the input determined at step 136, and the calculated vector distance is correlating with the color value of the reference input color and the color corresponding to the input and stored in the HDD 14C. At step 140, it is determined if the process at steps 120 to 138 has been executed or not for the saturated colors of all the reference colors and the complementary colors. If it is determined negative, then the process goes back to step 120, and the processes from step 120 to step 140 are repeated until it is determined affirmative at step 140. As a result, reference input colors are determined for saturated colors of all the reference colors and the complementary colors, and each of the colors corresponding to the output and the colors corresponding to the input are set, and the vector distances from the colors corresponding to the inputs are each calculated and stored.

When "the output color reproduction emphasis" mode is selected as the limiting condition in color gamut conversion, the reference input color is pre-processed by converting the color value into a color value of the color corresponding to the input determined at step 136. However, since the color corresponding to the input is determined by reverse conversion of the color corresponding to the output set at step 134 in the color gamut conversion, the reference input color is pre-processed and changed into the color value (color corresponding to the input) to be converted to the color corresponding to the output determined at step 134 after color gamut conversion. The color value set as the color corresponding to the output at step 134 (the color value equivalent to first color value or the color value equivalent to second color value) has a small difference in lightness and saturation from that of the reference input color, and since the hue of the input color is gradually set closer to the saturated color of the output side until it is determined affirmative at step 130, using the constant hue of reference input color as the initial hue of input color, the hue is closest to the hue of the reference input color, while the color value is positioned on the boundary of the output color gamut within the threshold value of saturation difference from the output side saturated color, the color value emphasizes the output color reproduction as compared with the color corresponding to the input as set in the pre-processing of the input color reproduction emphasis mode. Accordingly, the reference input color is pre-processed and changed into the color corresponding to the input determined at step 136, and hence, by conversion on the color corresponding to the output determined in step 136, color gamut conversion is carried out to the reference input color so as to satisfy also the limiting condition of the output color reproduction emphasis mode.

It should be noted that also in the output color reproduction emphasis pre-processing in the above steps 120 to 140, it is preferably configured such that, for example, before carrying out processing at step 126, it is determined whether or not the color value of the reference input colors set as the input color at step 124 falls within the output color gamut in the second device-independent color space, and when negative (when the color value of the reference input color does not fall within the output color gamut) then the processing from step 126 onwards is carried out, but on the other hand, if affirmative, then the color value of the reference input color is set to the color value of the input corresponding color of the reference input color as it is, and also the vector distance between the reference input color and the input corresponding color is set to 0, and after these have been correlated and stored in the HDD 14C, step 126 to step 138 are skipped and the determination of step 140 is carried out. By so doing, since substantially no pre-processing is carried out to the color values of the reference input colors that fall within the output color gamut in the second device-independent color space, or to the color gamut in the vicinity thereto, the color gamut is not expanded unnaturally by pre-processing and the color gamut is preserved, enabling appropriate reproduction of colors of the reference input colors and colors in the color regions in the vicinity thereto.

Furthermore, when the color value of the reference input color falls within the output color gamut in the second device-independent color space, then in place of the steps 126 to 134, after undertaking processing such that the color value of the reference input color as it is, is set for the color value of the output corresponding color for the reference input color, the process moves to step 136, the input color corresponding for the reference input color is set, and processing for calculating the vector distance and the like may be undertaken. When this occurs, in addition to there being substantially no pre-processing undertaken to the color value of the reference input color that falls within the output color gamut in the second device-independent color space, and the color gamut in the vicinity thereof, there is also substantially no color gamut conversion undertaken thereto, and such a color value and colors in the color gamut in the vicinity thereof may be reproduced correctly.

Figure 10:
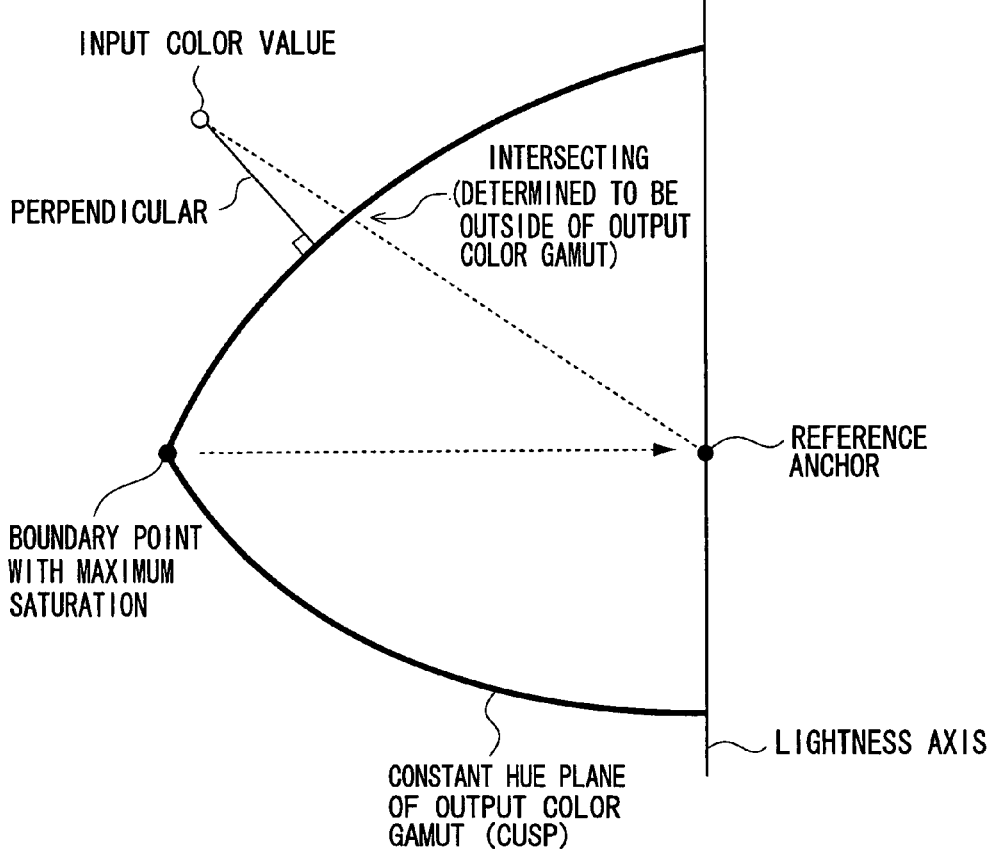
FIG. 10 is a schematic diagram for explaining an example of determining the inside and outside of input color value.

When determined affirmative at step 140, the process goes to step 142, and an input color value that has not been extracted as a reference input color for generation of conversion is taken out from the input color value group. At the next step 144, it is determined whether the input color value taken out at step 142 is positioned outside of the output color gamut on the second device-independent color space, or not. It may be determined, for example, as shown in FIG. 10, on the basis of the output color gamut boundary information, by extracting the constant hue plane (CUSP) in the output color gamut that includes the input color value, determining if the saturation on the extracted constant hue plane is the maximum boundary point or not, setting a color value for a reference anchor that is of the same lightness as the maximum boundary point and is on the lightness axis, determining if the straight line linking the input color value and the reference anchor intersects with the boundary of the output color gamut or not, however it may be determined by other method.

Figure 11:
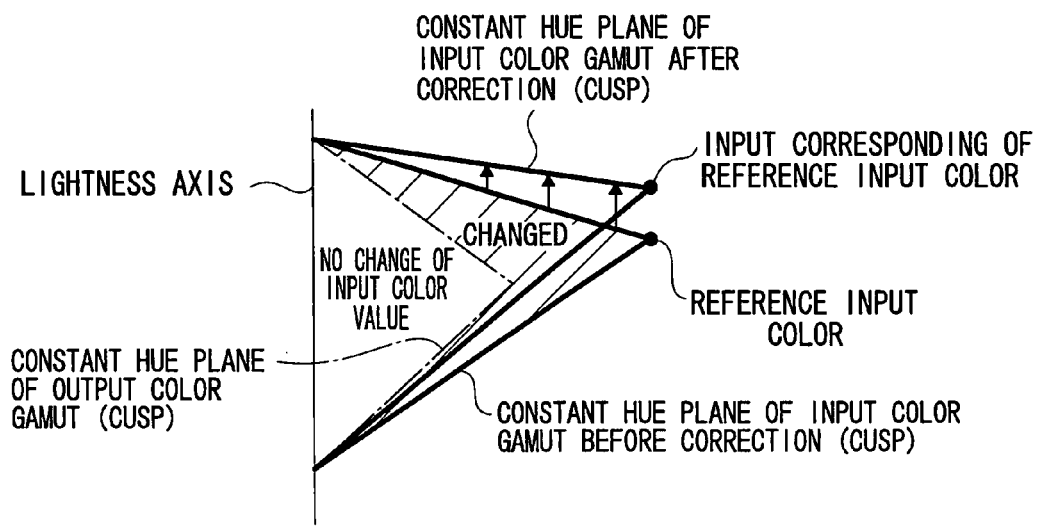
FIG. 11 is a schematic diagram explaining details of the pre-processing in FIG. 9.

When the input color value taken out at step 142 is positioned within the output color gamut, it is determined negative at step 144, and the process goes to step 146, and the input color value is set directly as the color value of the color corresponding to the input of input color value, and the process goes to step 158. As a result, from the input color values other than the reference input colors in the input color value group, the color value that is positioned within the output color gamut in the second device-independent color space is substantially not pre-processed (not changed in color value) (see also "no change of input color value" shown in FIG. 11), and color gamut conversion alone is carried out, and the color gamut conversion is carried out so that the output color reproduction may be more emphasized.

On the other hand, when the input color value taken out at step 142 is positioned outside of the output color gamut (the hatched area showing "presence of change" in FIG. 11), it is determined affirmative at step 144, and the process goes to step 148, and from 148 to step 156, the same as in the processes from step 94 to step 102 of pre-processing (FIG. 7) of the input color reproduction emphasis mode, for the colors corresponding to the input of the input color values having reference input color of the constant hue, the color values are calculated and determined on the basis of the relation (vector distance) of the reference input color of the constant hue and the color corresponding to that input, and for the input color values not having a reference input color of the constant hue, the color values of the color corresponding to the input are calculated and determined on the basis of the relation (vector distance) of a first reference input color similar in hue to the input color phase and the color corresponding to the first reference input color, and the relation (vector distance) of a second reference input color similar in hue to the input color phase and the color corresponding to the second reference input color, and the process goes to step 158.

At step 158, it is determined if the process step 142 and after has been executed on all input color values other than the reference input color value out of the input color value group for generation of conversion condition. If determined negative, the process returns back to step 142, the processes from step 142 to step 158 are repeated until it is determined affirmative at step 158. As a result, color values of the color corresponding to the input are set for all input color values other than the reference input colors out of the input color value group for generation of conversion condition.

Thus, in pre-processing emphasizing output color reproduction, too, as for the input color values outside of the output color gamut other than the reference input colors, the same as in the pre-processing emphasizing input color reproduction, the color values of the colors corresponding to the input can be calculated and set without calculating the colors corresponding to the output. But in pre-processing emphasizing output color reproduction, however, as the colors corresponding to the input of the reference input colors that are referred to when calculating the colors corresponding to the input for the input color values, since color values that satisfy the limiting condition of output color reproduction emphasis mode are calculated and set, this processing does not cause gaps in the color values (color value of the colors corresponding to the output) after color gamut conversion of reference input color for the colors corresponding to the input in the input color values other than the reference input colors, and estimated color values may be obtained that may be converted to appropriate color values that also satisfy the limiting condition of output color reproduction emphasis mode at the same time.

It should be noted that in the pre-processing emphasizing output color reproduction according to the present invention, as described above, from the group of input color values used for generating the conversion condition: for those input color values that are positioned within the output color gamut in the second device-independent color space, the color values are set as they are as the input color values for the input corresponding colors; and for input color values that are positioned outside of the color gamut in the second device-independent color space, color values of the input corresponding colors are calculated and set based on the relationship (vector distance) of the reference input colors of equal hue and their input corresponding colors, or the relationship (vector distance) between a first reference input color that is near in hue to that of the input color value and its input corresponding color and on the relationship (vector distance) of the reference input colors of equal hue and their input corresponding colors, or the relationship (vector distance) between a second reference input color that is near in hue to that of the input color value and its input corresponding color. Therefore, depending on the difference in shape of the input color gamut in the second device-independent color space and the output color gamut, when an image is displayed through carrying out pre-processing and color gamut conversion according to the present invention, there is a chance that a gradation gap occurs between colors corresponding to input color values positioned within the output color gamut in the second device-independent color space and colors corresponding to input color values positioned outside the output color gamut in the second device-independent color space.

Considering this, when pre-processing with output reproduction emphasis, when the input corresponding colors of the input color values placed outside of the output color gamut in the second device-independent color space are computed (step 150 or step 152 to step 156), it may be configured such that: computation is controlled such that the lightness and the saturation of the input corresponding colors become appropriate values so that the above described gradation gap is suppressed (for example, changing the values according to the distance between the input color values and the output color gamut boundary in the second device-independent color space (this change may be a linear variation or a non-linear variation) using a correction coefficient to correct the lightness and the saturation of the input corresponding colors, or the like); or the input corresponding color (and in particular the hue thereof) may be changed such that the above gradation gap is suppressed (however, it is preferable only to change the input corresponding colors for color values of reference input colors that have a large vector distance to the output corresponding color, or color values in the color gamut in the vicinity thereto).

By (calculating and) setting the color values of the colors corresponding to the input for all input color values for composing the input color value group for generation of conversion condition, when the color value group of the colors corresponding to the input is obtained, it is affirmative at step 158, and the pre-processing emphasizing output color reproduction is terminated, and the process goes to step 68 for color gamut conversion process (FIG. 4). By this pre-processing emphasizing output color reproduction (FIG. 9), the color values of the colors corresponding to the input obtained for individual input color values correspond to the values after change in the case of pre-processing for satisfying the limiting conditions of output color reproduction emphasis mode of individual input color values, and the correlating condition of individual input color values and the colors corresponding to the input corresponds to the pre-processing condition.

When the pre-processing emphasizing input color reproduction (FIG. 7) or the pre-processing emphasizing output color reproduction (FIG. 9) is finished, at step 68 for color gamut conversion (FIG. 4), on the basis of the output color gamut boundary information, color values of the colors corresponding to the input are taken out sequentially one at a time from the color value group of the colors corresponding to the input obtained by the pre-processing emphasizing input color reproduction or the pre-processing emphasizing output color reproduction, and the specified conversion rule for generation of color gamut conversion condition is applied to the taken color values of the colors corresponding to the input, thereby converting so that the position in the second device-independent color space may fall within the output color gamut boundary expressed by the output color gamut boundary information, and the output color values for generation of conversion condition are determined sequentially for all color values of the colors corresponding to the input, so that the output data group for generation of conversion condition is generated. As a result, the color gamut conversion condition for converting the color value of colors corresponding to the input into the output color values is set.

As the conversion rule, for example, a known conversion rule for color gamut conversion (gamut mapping) may be applied, and for the color values positioned in the output color gamut, these color values may be used as they are as the output color values (the color values of the colors corresponding to the input and the output color values being matched colorimetrically), and for the color values positioned outside of the output color gamut, the colors may be converted so as to fall within the output color gamut by applying a pasting type conversion rule for determining the output color value. Or a compression and decompression type conversion rule may be used for determining the output color value by converting the color values for all colors corresponding to the input in order to maintain the relative relationship of the points in the input color gamut. Pasting type conversion rules also include a method of projecting color values outside of the output color gamut onto the boundary of the output color gamut without changing the lightness thereof so as to maintain the lightness, and a method of projecting color values outside of the output color gamut onto the boundary of the output color gamut without changing the hue thereof so as to maintain the saturation, and either method is applicable. The compression and decompression type conversion rules also include a method of converting the color gamut so as to maintain the gradation, and such a method is also applicable. Further, an adaptive type conversion rule for applying a different conversion technique for each region may be used, or a combination type conversion rule of pasting type and compression and decompression type may also be applied.

As described herein, when output color values for generation of conversion condition are decided for all color values for composing the color value group of the colors corresponding to the input obtained by the pre-processing emphasizing input color reproduction or by the pre-processing emphasizing output color reproduction, at the next step 70, the color values in the color value group of the colors corresponding to the input are replaced by the input color values corresponding to the original input color value group for generation of conversion condition generated previously at step 58, and the input color value group after replacement is correlated with the output data group for generation of conversion condition generated at step 68, and set in the CLUT as conversion data. As a result, the conversion condition is obtained for simultaneously executing the conversion from the input color values for generation of the conversion condition into color values of the color corresponding to the input (that is, pre-processing emphasizing input color reproduction or output color reproduction), and the conversion from the color values of the colors corresponding to the input into the output color values for generation of the conversion condition (that is, the color gamut conversion for the color gamut conversion condition set at step 68), and the condition of pre-processing emphasizing input color reproduction or output color reproduction is integrated with the condition of color gamut conversion set at step 68, and the integrated conversion condition is generated (set in the CLUT).

At step 72, the image data (input data) expressing the image to be output by the second device and after first color conversion and second color conversion (see FIG. 2) is converted by the CLUT setting the color gamut conversion condition at step 70, and thereby the image data is pre-processed and color gamut converted at the same time, and the color gamut conversion process is terminated. Of the color gamut conversion process, step 68 to step 72 correspond to the color gamut conversion unit of the invention, and step 72 also corresponds, together with the pre-processing emphasizing input color reproduction (FIG. 7) and the pre-processing emphasizing output color reproduction (FIG. 9), to the pre-processing unit of the invention.

As described above, the image data after pre-processing and color gamut conversion is sequentially processed by a third color conversion and a fourth color conversion (see FIG. 2), and is output to the second device, and is used in the output of image in the second device. Accordingly, the difference between the appearance of an image in the first device and the appearance of an image in the second device, which is mainly caused by difference in color gamut between the first device and second device, is corrected. As the limiting condition of color gamut conversion, the input color reproduction emphasis or the output color reproduction emphasis is selected (set), however when the limiting condition is the input color reproduction emphasis, pre-processing emphasizing input color reproduction is executed, and when the limiting condition is the output color reproduction emphasis, pre-processing emphasizing output color reproduction is executed, and therefore in addition to the original purpose of color gamut conversion for making the color gamut of image data after color gamut conversion fall within the output color gamut, color gamut conversion that also satisfies the set limiting condition may be realized.

In the exemplary embodiment, by pre-processing according to the set limiting condition, the color values used in setting of color gamut conversion condition at step 68 are changed so as to satisfy the selected limiting condition. Accordingly, as the algorithm for realizing the setting of color gamut conversion condition at step 68, a general algorithm that does not consider satisfying the selected limiting condition can be used (an algorithm for simply satisfying the original purpose of color gamut conversion of making the image data after color gamut conversion fall within the output color gamut), and it is not required to change the algorithm whatever the content is of limiting condition. On the other hand, although it becomes necessary to develop the pre-processing specific to the individual limiting conditions, the pre-processing depending on the individual limiting conditions can be realized in a relatively simple process of determining the output corresponding colors satisfying the limiting condition from the color values (reference input color) of saturated colors of either the reference colors (primary) or complementary colors (secondary) for defining the second device-dependent color space, changing the reference input colors into the color values (colors corresponding to the input) that are converted to colors corresponding to the output by color gamut conversion, and changing the input color values other than the reference input colors according to the relationship of the reference input color and the color corresponding to the input. Therefore, the development cost for realizing color gamut conversion that also satisfies the set limiting condition can be substantially saved.

The pre-processing in the invention is not limited to pre-processing emphasizing input color reproduction or pre-processing emphasizing output color reproduction as mentioned above. For example, although explanation has been given above of pre-processing emphasizing input color reproduction in which the colors corresponding to the output of the reference input colors and the colors corresponding to the input of the reference input colors, are colors with the constant hue, there is no limitation to this relationship, and even if the limiting condition is input color reproduction emphasis, under the condition that the hue difference from the reference input color is within a specified value, the hue of the color corresponding to the output and the color corresponding to the input of the reference input colors may be changed for the reference input colors.

Also, in the above described pre-processing emphasizing input color reproduction or pre-processing emphasizing output color reproduction, the (color value group of color corresponding to input for defining) the pre-processing condition of input color reproduction emphasis or output color reproduction emphasis is determined, and the color gamut conversion condition is set by using the color value group of the color corresponding to the input, and the pre-processing condition and the color gamut conversion condition are integrated, and the integrated conversion condition is generated, and the image data is converted according to the integrated conversion condition, and the pre-processing and color gamut conversion are executed simultaneously, however the invention is not limited to this mode, and after the pre-processing (change of input color value) satisfying the set limiting condition, the color gamut conversion may be executed for setting the color value after the pre-processing within the output color gamut.

The limiting condition in the invention described above includes two types, input color reproduction emphasis and output color reproduction emphasis, however the invention is not limited to these, and three or more limiting conditions may be provided, including, for example, "colorimetric" condition intended to reproduce colors that are very close colorimetrically, "perceptual" condition intended to reproduce colors that appear to be equivalent visually, and "saturation" condition intended to reproduce sharp colors (slightly raised in saturation).

In the above explanation of the invention, the color gamut conversion program corresponding to the color processing program is preliminarily stored (installed) in the HDD 14C of the client terminal 14, however the color processing program may be presented in a format of CD-ROM, DVD-ROM, or other storage medium.

While the present invention has been illustrated and described with respect to specific exemplary embodiment thereof, it is to be understood that the invention is by no means limited thereto and encompasses all changes and modifications which will become possible within the spirits and scope of the invention.

What is claimed is:

1. A color processing apparatus comprising:
a color gamut conversion unit for setting, on the basis of output color gamut information expressing an output color gamut in a predetermined color space not depending on a specific device, a color gamut conversion condition for converting image data according to a specified conversion rule so that the color gamut of image data in the predetermined color space falls within the output color gamut, and carrying out color gamut conversion of input image data according to the set color gamut conversion condition;
a setting unit for setting a limiting condition for the color gamut conversion; and
a pre-processing unit, for changing the color value of specified color(s) so that the color value of the specified color(s) out of the input image data are converted by color gamut conversion by the color gamut conversion unit to an output corresponding color satisfying the limiting condition set through the setting unit, and for pre-processing so as to change the color values of colors other than the specified color(s) of the input image data according to the relationship between the color value before change of the specified color(s) and the color value after change of the specified color(s),
wherein the limiting condition comprises:
a limiting condition for emphasizing input color reproduction including a condition in which the color value of the output is determined based on a constant hue plane having the same hue as the hue of the specified color; and
a limiting condition for emphasizing output color reproduction including a condition in which the color value of the output is determined based on a saturation difference between the color on the output gamut side and the color value of the specified color.

2. The color processing apparatus of claim 1, wherein,
the pre-processing unit carries out pre-processing on individual color values within an input color gamut corresponding to a color reproduction region of the input image data in the predetermined color space, and
the color gamut conversion unit:
sets the color gamut conversion condition on the basis of the individual color values after the pre-processing by the pre-processing unit;
generates an integrated conversion condition by integrating together the pre-processing condition, correlated to the value before change and the value after change of individual color values in the pre-processing by the pre-processing unit, with the color gamut conversion condition set by the color gamut conversion unit;
converts the individual color values of the input image data according to the generated integrated conversion condition; and thereby
executes simultaneously the pre-processing by the pre-processing unit on the input image data and the color gamut conversion by the color gamut conversion unit.

3. The color processing apparatus of claim 1, wherein the specified color(s) is/are saturated color(s) of at least one color of reference colors and/or complementary colors for defining a color space of input image data before conversion of the image data in the predetermined color space, or for defining a color space depending on a specific device for image data output.

4. The color processing apparatus of claim 1, wherein the pre-processing unit determines the color value of the output corresponding color satisfying the set limiting condition from the color value of the specified color, determines the color value of a input corresponding color, by carrying out reverse conversion on the determined color value of the output corresponding color on the basis of the specified conversion rule, replaces the color value of the specified color with the color value of the input corresponding color, and thereby changes the color value of the specified color.

5. The color processing apparatus of claim 4, wherein the limiting condition(s) set through the setting unit include the limiting condition for emphasizing input color reproduction, and when the limiting condition for emphasizing input color reproduction is set through the setting unit, the pre-processing unit determines the color value of the output corresponding color satisfying the limiting condition as:
a first color value that is on the boundary of the output color gamut and that has the minimum distance in the specified color space to the color values of equal hue to the color value of the specified color;
a second color value that is on the boundary of the output color gamut, that is a color of equal hue to the color value of the specified color, and that is within a threshold value of distance in the predetermined color space from a reference color value of equal lightness to the color value of the specified color;
a third color value that is on the boundary of the output color gamut and that has a minimum vector distance to the color value of the specified color in the predetermined color space; or
a color value that is in the predetermined color space within the triangular shaped color range formed with the first color value, the second color value and the third color value at the apexes thereof.

6. The color processing apparatus of claim 4, wherein the limiting condition(s) set through the setting unit include the limiting condition for emphasizing output color reproduction, and
when the limiting condition for emphasizing the output color reproduction is set through the setting unit, the pre-processing unit determines the color value of the output corresponding color satisfying the limiting condition by selecting:
a fourth color value that is on the boundary of the output color gamut, and that is within a threshold value in saturation difference from the color value of the color on the output gamut side corresponding to the specified color, the fourth color value having a hue that is as close as possible to the hue of the color value of the specified color, and the fourth color value having the same lightness and saturation as the color value within the constant hue plane as the color value of the specified color that is a minimum distance in the predetermined color space;
a fifth color value that is on the boundary of the output color gamut, and that is within a threshold value in saturation difference from the color value of the color on the output gamut side corresponding to the specified color, the fifth color value being within a threshold distance in the predetermined color space from a reference color value that is on the boundary of the output color gamut of the constant hue plane as the specified color and having the same lightness as the color value of the specified color;
a sixth color value that is on the boundary of the output color gamut and has the minimum vector distance in the predetermined color space to the color value of the specified color; or a color value that is in the predetermined color space within the triangular shaped color range formed by the fourth color value, the fifth color value and the sixth color value at the apexes thereof.

7. The color processing apparatus of claim 5, wherein the pre-processing unit switches according to the specified color between using one or other of the plurality of color values as the output corresponding color satisfying the limiting condition.

8. The color processing apparatus of claim 6, wherein the pre-processing unit switches according to the specified color between using one or other of the plurality of color values as the output corresponding color satisfying the limiting condition.

9. The color processing apparatus of claim 7, wherein when the specified color has a hue within the range such that in CIEL*a*b* color space b*<0, the pre-processing unit uses the third color value or the sixth color value as the output corresponding color satisfying the limiting condition.

10. The color processing apparatus of claim 1, wherein range adjustment processing is carried out in advance, adjusting according to the output color gamut or an image output condition at least the lightness of the color values of the input image data of the input image data for which changes will be made in the color values by the pre-processing unit.

11. The color processing apparatus of claim 1, wherein, among color values that are other than the specified colors, the pre-processing unit processes the color values to be changed that are of the constant hue same as one of the specified colors by determining the vector distance between the color value before change and the color value after change of the specified color, deriving a reduced vector distance in accordance with the ratio of saturation of the color value before change and the color value after change of the specified color, and changing the color value to be changed on the basis of the derived vector distance, and, among color values that are other than the specified colors, the pre-processing unit processes the color values to be changed not having the constant hue same as the specified colors of by determining the vector distance between the color value before change and the color value after change of a first of the specified colors that is similar in hue to the color value to be changed, deriving a reduced first vector distance in accordance with the ratio of saturation of the color value before change and the color value after change of the first specified color, and by determining the vector distance of the color value before change and the color value after change of a second of the specified colors similar in hue to the color value to be changed, deriving a reduced second vector distance in accordance with the ratio of saturation of the color value before change and the color value after change of the second specified color, and the pre-processing unit calculates the weighted average of the first vector distance and the second vector distance according to the hue difference from the color value to be changed to the color value before being changed of the first specified color and the color value to be changed to the color value before being changed of the second specified color, and the pre-processing unit changes the color value to be changed on the basis of a vector distance equivalent to the calculated weighted average.

12. The color processing apparatus of claim 11, wherein when output color reproduction emphasis limitation condition is set through the pre-processing unit, among the color values that are other than the specified colors, the pre-processing unit only changes color values as the object for color value change for color values that are outside of the output color gamut in the predetermined color space.

13. The color processing apparatus of claim 1, wherein the pre-processing unit excludes color values of the specified color(s) that are color values of colors that fall within the output color gamut in the predetermined color space from being the object of color value change.

14. A color processing method comprising:
using a color gamut conversion unit to set, on the basis of output color gamut information expressing an output color gamut in a predetermined color space not depending on a specific device, a color gamut conversion condition for converting image data according to a specified conversion rule so that the color gamut of image data in the predetermined color space falls within the output color gamut;
using the color gamut conversion unit to carry out color gamut conversion of input image data according to the set color gamut conversion condition;
using a setting unit to set a limiting condition for the color gamut conversion;
using a pre-processing unit to change the color value of specified color(s) so that the color value of the specified color(s) out of the input image data are converted by color gamut conversion by the color gamut conversion unit to an output corresponding color satisfying the limiting condition set through the setting unit; and
using the pre-processing unit to pre-process so as to change the color values of colors other than the specified color(s) of the input image data according to the relationship between the color value before change of the specified color(s) and the color value after change of the specified color(s);
wherein the limiting condition comprises:
a limiting condition for emphasizing input color reproduction including a condition in which the color value of the output is determined based on a constant hue plane having the same hue as the hue of the specified color; and
a limiting condition for emphasizing output color reproduction including a condition in which the color value of the output is determined based on a saturation difference between the color on the output gamut side and the color value of the specified color.

15. A recording medium storing a color processing program for causing a computer to function as:
a color gamut conversion unit for setting, on the basis of output color gamut information expressing an output color gamut in a predetermined color space not depending on a specific device, a color gamut conversion condition for converting image data according to a specified conversion rule so that the color gamut of image data in the predetermined color space falls within the output color gamut, and carrying out color gamut conversion of input image data according to the set color gamut conversion condition;
a setting unit for setting a limiting condition for the color gamut conversion; and
a pre-processing unit, for changing the color value of specified color(s) so that the color value of the specified color(s) out of the input image data are converted by color gamut conversion by the color gamut conversion unit to an output corresponding color satisfying the limiting condition set through the setting unit, and for pre-processing so as to change the color values of colors other than the specified color(s) of the input image data according to the relationship between the color value before change of the specified color(s) and the color value after change of the specified color(s)), wherein the limiting condition comprises:

a limiting condition for emphasizing input color reproduction including a condition in which the color value of the output is determined based on a constant hue plane having the same hue as the hue of the specified color; and a limiting condition for emphasizing output color reproduction including a condition in which the color value of the output is determined based on a saturation difference between the color on the output gamut side and the color value of the specified color.

* * * * *